(12) United States Patent
Reddy et al.

(10) Patent No.: US 7,404,440 B2
(45) Date of Patent: Jul. 29, 2008

(54) METHODS OF USING CASING STRINGS IN SUBTERRANEAN CEMENTING OPERATIONS

(75) Inventors: B. Raghava Reddy, Duncan, OK (US); Anthony M. Badalamenti, Katy, TX (US); Simon Turton, Kingwood, TX (US); Karl W. Blanchard, Cypress, TX (US); Ronald R. Faul, Katy, TX (US); Michael G Crowder, Orlando, OK (US); Henry E. Rogers, Duncan, OK (US); James E. Griffith, Loco, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/862,307

(22) Filed: Sep. 27, 2007

(65) Prior Publication Data

US 2008/0041591 A1 Feb. 21, 2008

Related U.S. Application Data

(62) Division of application No. 10/973,618, filed on Oct. 26, 2004, now Pat. No. 7,303,014.

(51) Int. Cl.
*E21B 33/14* (2006.01)
(52) U.S. Cl. ............ 166/292; 166/242.1; 166/285; 166/300
(58) Field of Classification Search ............ 166/207, 166/242, 285, 292, 300, 376, 902
See application file for complete search history.

(56) References Cited

U.S. PATENT DOCUMENTS

| 2,223,509 A | 12/1940 | Brauer |
| 2,230,589 A | 2/1941 | Driscoll |
| 2,308,072 A | 1/1943 | Granger |

(Continued)

FOREIGN PATENT DOCUMENTS

EP 0 419 281 A2 3/1991

(Continued)

OTHER PUBLICATIONS

Griffith, et al., "Reverse Circulation of Cement on Primary Jobs Increases Cement Column Height Across Weak Formations," Society of Petroleum Engineers, SPE 25440, 315-319, Mar. 22-23, 1993.

(Continued)

*Primary Examiner*—George Suchfield
(74) *Attorney, Agent, or Firm*—John W. Wustenberg; Baker Botts, L.L.P.

(57) ABSTRACT

Improved casing strings, and methods of using improved casing strings in subterranean cementing operations, are provided. An example of an apparatus is a pipe string comprising at least one pipe section and a delivery system of an activator. Another example of an apparatus is a pipe string comprising at least one pipe section and a delivery system of a set retarder. An example of a method is a method of cementing in a subterranean formation. Other examples of methods are methods of cementing in a subterranean formation comprising a well bore.

14 Claims, 11 Drawing Sheets

U.S. PATENT DOCUMENTS

| | | | |
|---|---|---|---|
| 2,407,010 A | 9/1946 | Hudson | |
| 2,472,466 A | 6/1949 | Counts et al. | |
| 2,647,727 A | 8/1953 | Edwards | |
| 2,675,082 A | 4/1954 | Hall | |
| 2,790,724 A | 4/1957 | Bergman | 106/728 |
| 2,849,213 A | 8/1958 | Failing | |
| 2,864,449 A | 12/1958 | Tausch | |
| 2,919,709 A | 1/1960 | Schwegman | |
| 3,051,246 A | 8/1962 | Clark, Jr. et al. | |
| 3,110,347 A | 11/1963 | Howard et al. | |
| 3,116,793 A | 1/1964 | McStravick | |
| 3,181,610 A | 5/1965 | Wiley | 166/293 |
| 3,193,010 A | 7/1965 | Bielstien | |
| 3,277,962 A | 10/1966 | Flickinger et al. | |
| 3,489,219 A | 1/1970 | Higgins | 166/253.1 |
| 3,570,596 A | 3/1971 | Young | |
| 3,948,322 A | 4/1976 | Baker | |
| 3,948,588 A | 4/1976 | Curington et al. | |
| 3,951,208 A | 4/1976 | Delano | |
| 4,105,069 A | 8/1978 | Baker | |
| 4,271,916 A | 6/1981 | Williams | |
| 4,300,633 A | 11/1981 | Stewart | |
| 4,304,298 A | 12/1981 | Sutton | |
| 4,340,427 A | 7/1982 | Sutton | |
| 4,367,093 A | 1/1983 | Burkhalter et al. | |
| RE31,190 E | 3/1983 | Detroit et al. | |
| 4,423,781 A | 1/1984 | Thomas | |
| 4,450,010 A | 5/1984 | Burkhalter et al. | |
| 4,457,379 A | 7/1984 | McStravick | |
| 4,469,174 A | 9/1984 | Freeman | |
| 4,519,452 A | 5/1985 | Tsao et al. | |
| 4,531,583 A | 7/1985 | Revett | |
| 4,548,271 A | 10/1985 | Keller | |
| 4,555,269 A | 11/1985 | Rao et al. | |
| 4,565,578 A | 1/1986 | Sutton et al. | |
| 4,669,541 A | 6/1987 | Bissonnette | 166/154 |
| 4,671,356 A | 6/1987 | Barker et al. | |
| 4,676,832 A | 6/1987 | Childs et al. | |
| 4,729,432 A | 3/1988 | Helms | |
| 4,791,988 A | 12/1988 | Trevillion | |
| 4,854,386 A | 8/1989 | Baker et al. | 166/291 |
| 4,961,465 A | 10/1990 | Brandell | |
| 5,024,273 A | 6/1991 | Coone et al. | |
| 5,117,910 A | 6/1992 | Brandell et al. | |
| 5,125,455 A | 6/1992 | Harris et al. | |
| 5,133,409 A | 7/1992 | Bour et al. | |
| 5,147,565 A | 9/1992 | Bour et al. | |
| 5,188,176 A | 2/1993 | Carpenter | |
| 5,213,161 A | 5/1993 | King et al. | |
| 5,273,112 A | 12/1993 | Schultz | |
| 5,297,634 A | 3/1994 | Loughlin | |
| 5,318,118 A | 6/1994 | Duell | |
| 5,323,858 A | 6/1994 | Jones et al. | |
| 5,343,951 A | 9/1994 | Cowan et al. | |
| 5,361,842 A | 11/1994 | Hale et al. | |
| 5,447,197 A * | 9/1995 | Rae et al. | 166/293 |
| 5,458,198 A | 10/1995 | Hashemi et al. | |
| 5,484,019 A | 1/1996 | Griffith | |
| 5,494,107 A | 2/1996 | Bode | |
| 5,507,345 A | 4/1996 | Wiehunt, Jr. et al. | |
| 5,559,086 A | 9/1996 | Dewprashad et al. | |
| 5,571,281 A | 11/1996 | Allen | |
| 5,577,865 A | 11/1996 | Manrique et al. | |
| 5,641,021 A | 6/1997 | Murray et al. | |
| 5,647,434 A | 7/1997 | Sullaway et al. | |
| 5,671,809 A | 9/1997 | McKinzie | |
| 5,700,767 A | 12/1997 | Adams | |
| 5,718,292 A | 2/1998 | Heathman et al. | |
| 5,738,171 A | 4/1998 | Szarka | |
| 5,749,418 A | 5/1998 | Mehta et al. | |
| 5,762,139 A | 6/1998 | Sullaway et al. | |
| 5,803,168 A | 9/1998 | Lormand et al. | |
| 5,829,526 A | 11/1998 | Rogers et al. | |
| 5,875,844 A | 3/1999 | Chatterji et al. | |
| 5,890,538 A | 4/1999 | Bierute et al. | |
| 5,897,699 A | 4/1999 | Chatterji et al. | |
| 5,900,053 A | 5/1999 | Brothers et al. | |
| 5,913,364 A | 6/1999 | Sweatman | |
| 5,968,255 A | 10/1999 | Mehta et al. | |
| 5,972,103 A | 10/1999 | Mehta et al. | |
| 6,060,434 A | 5/2000 | Sweatman et al. | |
| 6,063,738 A | 5/2000 | Chatterji et al. | |
| 6,098,710 A | 8/2000 | Rhein-Knudsen et al. | |
| 6,138,759 A | 10/2000 | Chatterji et al. | |
| 6,143,069 A | 11/2000 | Brothers et al. | |
| 6,167,967 B1 | 1/2001 | Sweatman | |
| 6,196,311 B1 | 3/2001 | Treece et al. | |
| 6,204,214 B1 | 3/2001 | Singh et al. | |
| 6,244,342 B1 | 6/2001 | Sullaway et al. | |
| 6,258,757 B1 | 7/2001 | Sweatman et al. | |
| 6,311,775 B1 | 11/2001 | Allamon et al. | |
| 6,318,472 B1 | 11/2001 | Rogers et al. | |
| 6,367,550 B1 | 4/2002 | Chatterji et al. | |
| 6,431,282 B1 | 8/2002 | Bosma et al. | |
| 6,454,001 B1 | 9/2002 | Thompson et al. | |
| 6,457,524 B1 | 10/2002 | Roddy | |
| 6,467,546 B2 | 10/2002 | Allamon et al. | |
| 6,481,494 B1 | 11/2002 | Dusterhoft et al. | |
| 6,484,804 B2 | 11/2002 | Allamon et al. | |
| 6,488,088 B1 | 12/2002 | Kohli et al. | |
| 6,488,089 B1 | 12/2002 | Bour et al. | |
| 6,488,763 B2 | 12/2002 | Brothers et al. | |
| 6,540,022 B2 | 4/2003 | Dusterhoft et al. | |
| 6,547,007 B2 | 4/2003 | Szarka | |
| 6,622,798 B1 | 9/2003 | Rogers et al. | |
| 6,666,266 B2 | 12/2003 | Starr et al. | |
| 6,666,268 B2 | 12/2003 | Griffith et al. | |
| 6,679,336 B2 | 1/2004 | Musselwhite et al. | |
| 6,712,150 B1 | 3/2004 | Misselbrook et al. | |
| 6,715,553 B2 | 4/2004 | Reddy et al. | |
| 6,722,434 B2 | 4/2004 | Reddy et al. | |
| 6,725,935 B2 | 4/2004 | Szarka et al. | |
| 6,732,797 B1 | 5/2004 | Watters et al. | |
| 6,758,276 B2 | 7/2004 | Reynolds | |
| 6,758,281 B2 | 7/2004 | Sullaway et al. | |
| 6,786,629 B2 | 9/2004 | Rondeau et al. | |
| 6,802,373 B2 | 10/2004 | Dillenbeck et al. | |
| 6,802,374 B2 | 10/2004 | Edgar et al. | |
| 6,808,024 B2 | 10/2004 | Schwendemann et al. | |
| 6,810,958 B2 | 11/2004 | Szarka et al. | |
| 6,883,605 B2 | 4/2005 | Arceneaux | |
| 6,920,929 B2 | 7/2005 | Bour | |
| 7,013,971 B2 | 3/2006 | Griffith et al. | |
| 7,066,256 B2 | 6/2006 | Dillenbeck et al. | 166/255.1 |
| 7,066,283 B2 | 6/2006 | Livingstone | |
| 7,137,446 B2 | 11/2006 | Gagliano et al. | 166/250.02 |
| 7,143,846 B2 | 12/2006 | Jarvela | |
| 7,204,327 B2 | 4/2007 | Livingstone | |
| 7,237,623 B2 | 7/2007 | Hannegan | |
| 7,252,147 B2 | 8/2007 | Badalamenti et al. | |
| 7,284,608 B2 * | 10/2007 | Reddy et al. | 166/291 |
| 7,290,611 B2 | 11/2007 | Badalamenti et al. | |
| 7,290,612 B2 | 11/2007 | Rogers et al. | |
| 7,303,008 B2 * | 12/2007 | Badalamenti et al. | 166/250.14 |
| 7,303,014 B2 * | 12/2007 | Reddy et al. | 166/293 |
| 7,322,412 B2 * | 1/2008 | Badalamenti et al. | 166/285 |
| 2003/0029611 A1 | 2/2003 | Owens | |
| 2003/0192695 A1 | 10/2003 | Dillenbeck et al. | 166/285 |
| 2005/0199390 A1 | 9/2005 | Curtice et al. | |
| 2005/0205255 A1 | 9/2005 | Gagliano et al. | 166/250.02 |

| | | |
|---|---|---|
| 2006/0042798 A1 | 3/2006 | Badalamenti et al. |

FOREIGN PATENT DOCUMENTS

| GB | 2193741 | | 2/1988 |
|---|---|---|---|
| GB | 2327442 | A | 1/1999 |
| GB | 2348828 | A | 10/2000 |
| RU | 1774986 | | 11/1992 |
| RU | 1778274 | | 11/1992 |
| RU | 1 542 143 | C | 12/1994 |
| RU | 2067158 | | 9/1996 |
| RU | 2086752 | C1 | 8/1997 |
| SU | 1420139 | A1 | 8/1988 |
| SU | 1723309 | A1 | 2/1992 |
| SU | 1758211 | A1 | 8/1992 |
| WO | WO 2004/104366 | | 12/2004 |
| WO | SU 1716096 | A1 | 9/2005 |
| WO | WO 2005/083229 | A | 9/2005 |
| WO | WO 2006/008490 | A1 | 1/2006 |
| WO | WO 2006/042798 | A1 | 4/2006 |
| WO | WO 2006/064184 | A1 | 6/2006 |

OTHER PUBLICATIONS

Filippov, et al., "Expandable Tubular Solutions," Society of Petroleum Engineers, SPE 56500, Oct. 3-6, 1999.
Daigle, et al., "Expandable Tubulars: Field Examples of Application in Well Construction and Remediation," Society of Petroleum Engineers, SPE 62958, Oct. 1-4, 2000.
Carpenter, et al., "Remediating Sustained Casing Pressure by Forming a Downhole Annular Seal With Low-Melt-Point Eutectic Metal," IADC/SPE 87198, Mar. 2-4, 2004.
Halliburton Casing Sales Manual, Section 4, Cementing Plugs, pp. 4-29 and 4-30, Oct. 6, 1993.
G.L. Cales, "The Development and Applications of Solid Expandable Tubular Technology," Paper No. 2003-136, Petroleum Society's Canadian International Petroleum Conference 2003, Jun. 10-12, 2003.
Gonzales, et al., "Increasing Effective Fracture Gradients by Managing Wellbore Temperatures," IADC/SPE 87217, Mar. 2-4, 2004.
Fryer, "Evaluation of the Effects of Multiples in Seismic Data From the Gulf Using Vertical Seismic Profiles," SPE 25540, 1993.
Griffith, "Monitoring Circulatable Hole With Real-Time Correction: Case Histories," SPE 29470, 1995.
Ravi, "Drill-Cutting Removal in a Horizontal Wellbore for Cementing," IADC/SPE 35081, 1996.
MacEachern, et al., "Advances in Tieback Cementing," IADC/SPE 79907, 2003.
Davies, et al, "Reverse Circulation of Primary Cementing Jobs—Evaluation and Case History," IADC/SPE 87197, Mar. 2-4, 2004.
Brochure, Eventure Global Technology, "Expandable-Tubular Technology," pp. 1-6, 1999.
Dupal, et al, "Solid Expandable Tubular Technology—A Year of Case Histories in the Drilling Environment," SPE/IADC 67770, Feb. 27-Mar. 1, 2001.
DeMong, et al., "Planning the Well Construction Process for the Use of Solid Expandable Casing," SPE/IADC 85303, Oct. 20-22, 2003.
Waddell, et al., "Installation of Solid Expandable Tubular Systems Through Milled Casing Windows," IADC/SPE 87208, Mar. 2-4, 2004.
DeMong, et al., "Breakthroughs Using Solid Expandable Tubulars to Construct Extended Reach Wells," IADC/SPE 87209, Mar. 2-4, 2004.
Escobar, et al., "Increasing Solid Expandable Tubular Technology Reliability in a Myriad of Downhole Environments," SPE 81094, Apr. 27-30, 2003.

R. Marquaire et al., "Primary Cementing by Reverse Circulation Solves Critical Problem in the North Hassi-Messaoud Filed, Algeria", SPE 1111, Feb. 1966.
Foreign Communication From a Related Counter Part Application, Jan. 8, 2007.
Foreign Communication From a Related Counter Part Application, Jan. 17, 2007.
Foreign Communication From a Related Counter Part Application, Dec. 7, 2005.
Foreign Communication From a Related Counter Part Application, Oct. 12, 2005.
Foreign Communication From a Related Counter Part Application, Sep. 30, 2005.
Foreign Communication From a Related Counter Part Application, Dec. 9, 2005.
Foreign Communication From a Related Counter Part Application, Feb. 24, 2005.
Foreign Communication From a Related Counter Part Application, Dec. 27, 2005.
Foreign Communication From a Related Counter Part Application, Feb. 23, 2006.
Foreign Communication From a Related Counter Part Application, Feb. 27, 2007.
Halliburton Brochure Entitled "Bentonite (Halliburton Gel) Viscosifier", 1999.
Halliburton Brochure Entitled "Diacel D Lightweight Cement Additive", 1999.
Halliburton Brochure Entitled "Cementing Flex-Plug® OBM Lost-Circulation Material", 2004.
Halliburton Brochure Entitled "Cementing FlexPlug® W Lost-Circulation Material", 2004.
Halliburton Brochure Entitled "Gilsonite Lost-Circulation Additive", 1999.
Halliburton Brochure Entitled "Micro Fly Ash Cement Component", 1999.
Halliburton Brochure Entitled "Silicalite Cement Additive", 1999.
Halliburton Brochure Entitled "CAL-SEAL 60 Cement Accelerator", 1999.
Halliburton Brochure Entitled "Spherelite Cement Additive", 1999.
Halliburton Brochure Entitled "Increased Integrity With the Stratalock Stabilization System", 1998.
Halliburton Brochure Entitled "Perlite Cement Additive", 1999.
Halliburton Brochure Entitled "The Permaseal System Versatile, Cost-Effective Sealants for Conformance Applications", 2002.
Halliburton Brochure Entitled "Pozmix® a Cement Additive", 1999.
Office Action from U.S. Appl. No. 10/973,322, filed Nov. 3, 2006.
Office Action from U.S. Appl. No. 10/973,322, filed Jan. 5, 2007.
Office Action from U.S. Appl. No. 10/973,322, filed Apr. 24, 2007.
Office Action from U.S. Appl. No. 10/973,322, filed Jun. 22, 2007.
Office Action from U.S. Appl. No. 10/973,322, filed Jul. 23, 2007.
Notice of Allowance from 10/973,322, filed Aug. 13, 2007.
Office Action from U.S. Appl. No. 10/973,618, filed Jun. 29, 2007.
Office Action from U.S. Appl. No. 10/973,618, filed Apr. 27, 2007.
Office Action from U.S. Appl. No. 10/973,618, filed Jan. 4, 2007.
Office Action from U.S. Appl. No. 10/973,618, filed Nov. 24, 2006.
Office Action dated Jan. 8, 2008 for U.S. Appl. No. 11/862,300.
Notice of Publication dated Jan. 17, 2008 for U.S. Appl. No. 11/862,300.
Office Action dated Jan. 7, 2008 for U.S. Appl. No. 11/862,270.
Notice of Publication dated Jan. 17, 2008 for U.S. Appl. No. 11/862,270.
Notice of Publication of Application for U.S. Appl. No. 11/862,329, filed Feb. 21 , 2008.
Office Action for U.S. Appl. No. 11/862,329, filed Mar. 4, 2008.
Office Action for U.S. Appl. No. 11/862,337, filed Feb. 12, 2008.
Notice of Publication of Application for U.S. Appl. No. 11/862,337, filed Feb. 21, 2008.

* cited by examiner

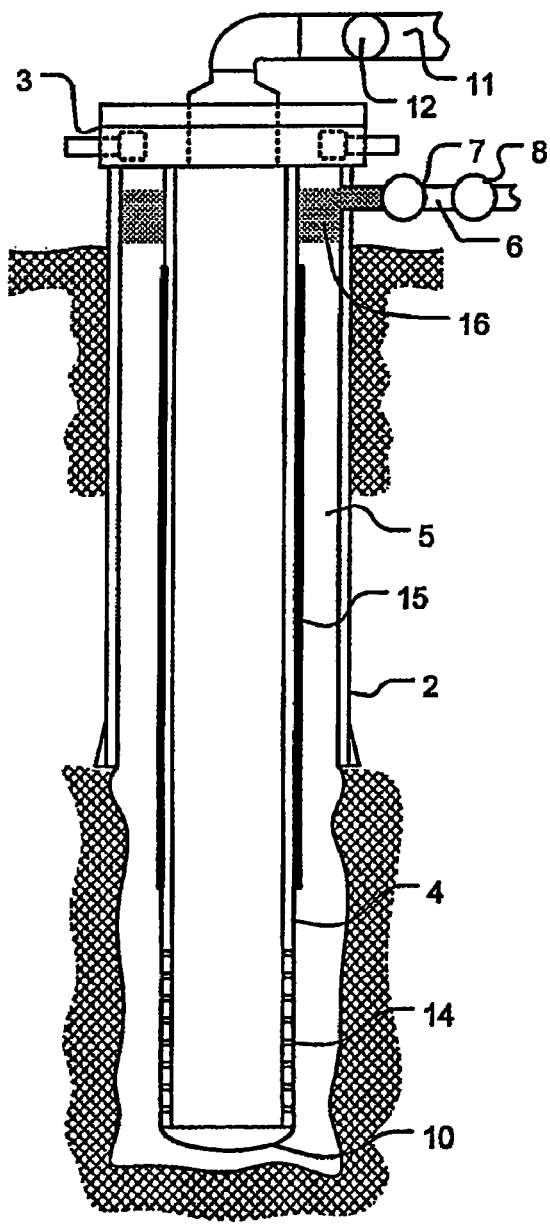
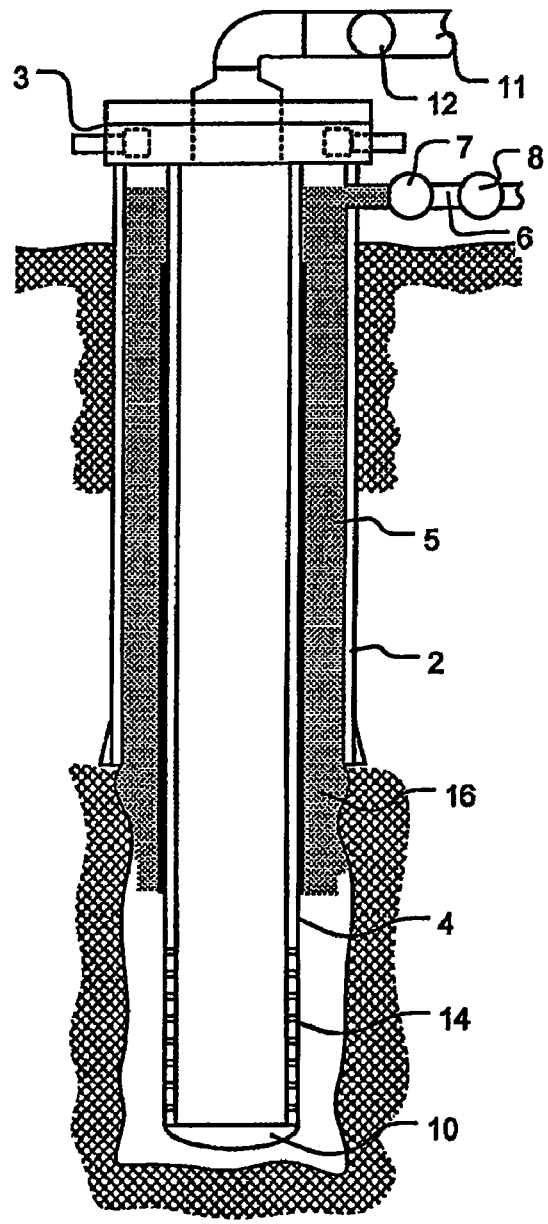
FIGURE 2A                    FIGURE 2B

METHODS OF USING CASING STRINGS IN SUBTERRANEAN CEMENTING OPERATIONS

CROSS REFERENCE TO RELATED APPLICATIONS

This application is a divisional of application Ser. No. 10/973,618, filed on Oct. 26, 2004 now U.S. Pat. No. 7,303,014.

BACKGROUND OF THE INVENTION

The present invention relates to subterranean cementing operations, and more particularly, to improved casing strings, and methods of using such improved casing strings in subterranean cementing operations.

Hydraulic cement compositions commonly are utilized in subterranean operations, particularly subterranean well completion and remedial operations. For example, hydraulic cement compositions are used in primary cementing operations whereby pipe strings, such as casings and liners, are cemented in well bores. In typical primary cementing operations, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore. Conventionally, two common pumping methods have been used to place the cement composition in the annulus. First, the cement composition may be pumped down the inner diameter of the pipe string, out through a casing shoe and/or circulation valve at the bottom of the pipe string and up through the annulus to its desired location. This is referred to as a conventional-circulation direction method. Second, the cement composition may be pumped directly down the annulus so as to displace well fluids present in the annulus by pushing it through the casing shoe and up into the inner diameter of the pipe string. This is referred to as a reverse-circulation direction method.

In reverse-circulation methods, it is generally undesirable for the cement composition to enter the inner diameter of the pipe string from the annulus through the casing shoe and/or circulation valve. This often is the case, because any resultant set cement typically must be drilled out before further operations are conducted in the well bore. The drill out procedure may be avoided by preventing the cement composition from entering the inner diameter of the pipe string through the casing shoe and/or circulation valve.

SUMMARY OF THE INVENTION

The present invention relates to subterranean cementing operations, and more particularly, to improved casing strings, and methods of using improved casing strings in subterranean cementing operations.

An example of a method of the present invention is a method of cementing in a subterranean formation, comprising: placing a cement composition comprising a base fluid, a cement, and a set retarder in a subterranean formation; providing a pipe string comprising an activator disposed on an outer surface of the pipe string; placing the pipe string into the subterranean formation; allowing the cement composition to be activated by the activator; and permitting the cement composition to set in the subterranean formation.

Another example of a method of the present invention is a method of cementing in a subterranean formation comprising a well bore, comprising: providing a pipe string comprising an activator on an outer surface of the pipe string; placing the pipe string into the well bore, whereby an annulus is defined between the outer surface of the pipe string and the walls of the well bore; flowing a cement composition into the annulus in a reverse-circulation direction; and permitting the cement composition and the activator to contact each other so as to cause the cement composition to set within the annulus.

Another example of a method of the present invention is a method of cementing in a subterranean formation comprising a well bore comprising: providing a pipe string comprising a set retarder on an outer surface of the pipe string; placing the pipe string into the well bore, whereby an annulus is defined between the outer surface of the pipe string and the walls of the well bore; flowing a cement composition into the annulus in a reverse-circulation direction; and permitting the cement composition and the set retarder to contact each other so as to extend the amount of time during which the cement composition remains fluid within the annulus.

Another example of a method of the present invention is a method of cementing in a subterranean formation comprising a well bore, comprising: providing a pipe string comprising an activator disposed adjacent an outer surface of the pipe string; placing the pipe string into the well bore, whereby an annulus is defined between the outer surface of the pipe string and the walls of the well bore; flowing a cement composition into the annulus in a reverse-circulation direction; permitting a portion of the cement composition and the activator to contact each other so as to cause the portion of the cement composition to flash set in the annulus.

An example of an apparatus of the present invention is a pipe string comprising: at least one pipe section; and a delivery system of an activator.

Another example of an apparatus of the present invention is a pipe string comprising: at least one pipe section; and a delivery system of a set retarder.

The features and advantages of the present invention will be readily apparent to those skilled in the art upon a reading of the description of embodiments, which follows.

BRIEF DESCRIPTION OF THE DRAWINGS

A more complete understanding of the present disclosure and advantages thereof may be acquired by referring to the following description taken in conjunction with the accompanying drawings, wherein:

FIG. 2A illustrates a cross sectional side view of a well bore having a casing configuration similar to that of FIG. 1.

FIG. 2B illustrates a cross sectional side view of the well bore of FIG. 2A.

Figure 1:
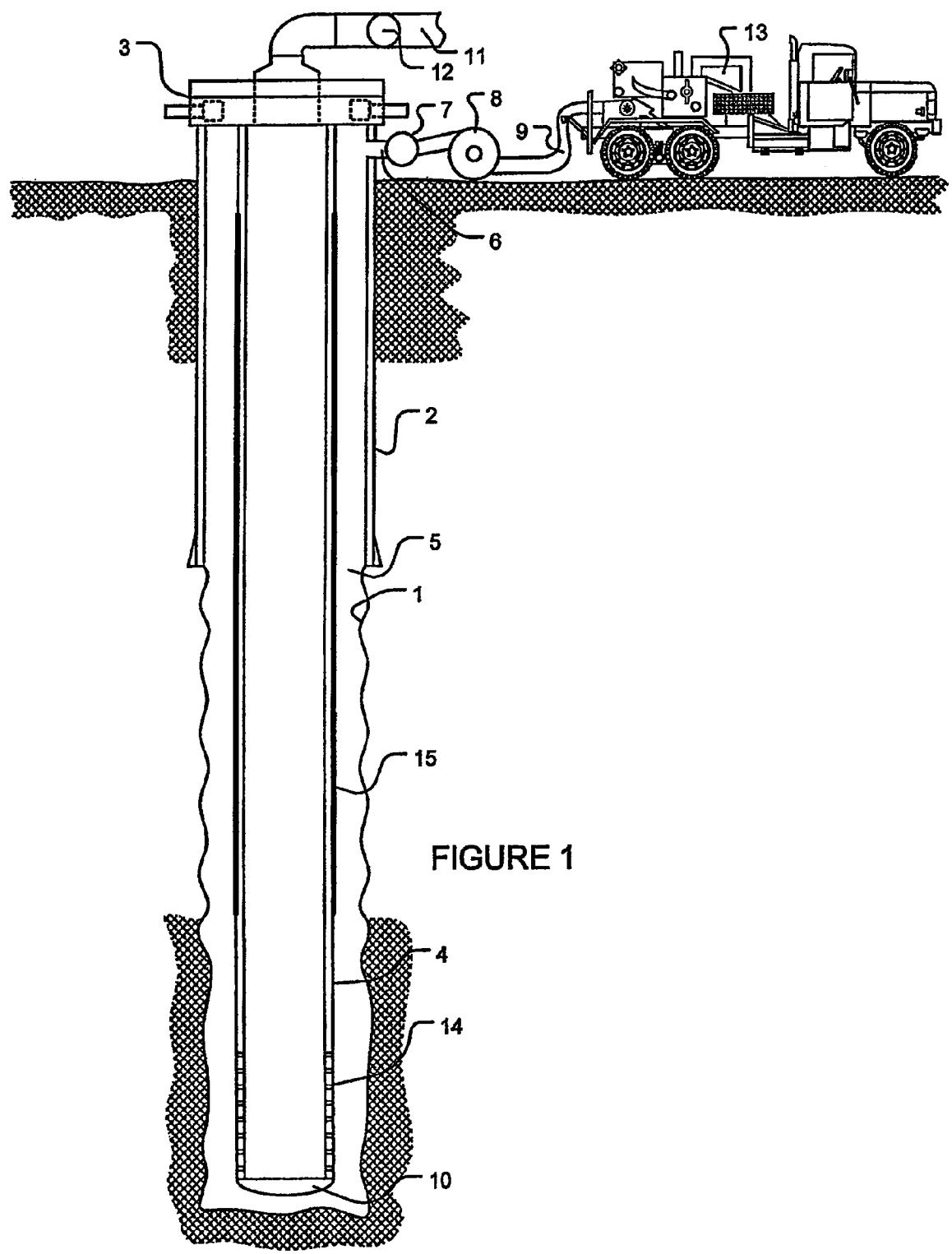
FIG. 1 illustrates a cross sectional side view of a well bore.

While the present invention is susceptible to various modifications and alternative forms, specific embodiments thereof have been shown in the drawings and are herein described. It should be understood, however, that the description herein of specific embodiments does not limit the invention to the particular forms disclosed, but on the contrary, covers all modifications, equivalents, and alternatives falling within the spirit and scope of the invention as defined by the appended claims.

DETAILED DESCRIPTION OF EMBODIMENTS

The present invention relates to subterranean cementing operations, and more particularly, to improved casing strings, and methods of using improved casing strings in subterranean cementing operations. Certain embodiments of the present invention involve the use of "delayed set" cement compositions that remain in a slurry state (e.g., resistant to gelation) for an extended period of time. Certain other embodiments of the present invention involve additional uses of cement compositions comprising high aluminate cements and/or phosphate cements.

A. The Delayed-set Cement Compositions Useful with the Present Invention

The delayed-set cement compositions useful in the present invention generally comprise a cement, a base fluid, and a set retarder. A wide variety of optional additives may be included in the cement compositions if desired.

Certain embodiments of the delayed-set cement compositions useful with the present invention may remain in a slurry state for an amount of time in the range of from about 6 hours to about 4 days under downhole conditions. Other embodiments of the delayed set cement compositions useful with the present invention may remain in a slurry state for a greater, or shorter, amount of time. Generally, the delayed-set cement compositions comprise a cement, a base fluid, and a set retarder. The delayed-set cement compositions useful with the present invention may be prompted to set at a desired time by contacting the cement compositions with a suitable activator composition. In certain embodiments of the present invention, the suitable activator composition may be disposed along an outer surface of an improved casing string of the present invention.

1. Suitable Cements

Any cement suitable for use in subterranean applications may be suitable for use in the present invention. In certain embodiments, the cement compositions used in the present invention comprise a hydraulic cement. A variety of hydraulic cements are suitable for use, including those comprising calcium, aluminum, silicon, oxygen, and/or sulfur, which set and harden by reaction with water. Such hydraulic cements include, but are not limited to, Portland cements, pozzolanic cements, high aluminate cements, gypsum cements, silica cements, and high alkalinity cements. Cements comprising shale or blast furnace slag also may be suitable for use in the present invention. In certain embodiments, the shale may comprise vitrified shale; in certain other embodiments, the shale may comprise raw shale (e.g., unfired shale), or a mixture of raw shale and vitrified shale.

2. Suitable Base Fluids

The cement compositions used in the present invention generally comprise a base fluid. A wide variety of base fluids may be suitable for use with the present invention, including, inter alia, an aqueous-based base fluid, a nonaqueous-based base fluid, and mixtures thereof. Where the base fluid is aqueous-based, it may comprise water that may be from any source, provided that the water does not contain an excess of compounds (e.g., dissolved organics, such as tannins) that may adversely affect other compounds in the cement compositions. For example, a cement composition useful with the present invention can comprise fresh water, salt water (e.g., water containing one or more salts dissolved therein), brine (e.g., saturated salt water), or seawater. Where the base fluid is nonaqueous-based, the base fluid may comprise any number of organic liquids. Examples of suitable organic liquids include, but are not limited to, mineral oils, synthetic oils, esters, and the like. Generally, any organic liquid in which a water solution of salts can be emulsified is suitable for use as a base fluid in the cement compositions used with the present invention. In certain preferred embodiments of the present invention wherein primary cementing is performed, an aqueous-based base-fluid may be used. The base fluid may be present in an amount sufficient to form a pumpable slurry. More particularly, in certain embodiments wherein the base fluid is water, the base fluid may be present in the cement compositions used in the present invention in an amount in the range of from about 25% to about 150% by weight of cement ("bwoc"). In certain embodiments wherein the base fluid is water, the base fluid may be present in the cement compositions in the range of from about 30% to about 75% bwoc. In still other embodiments wherein the base fluid is water, the base fluid may be present in the cement compositions in the range of from about 35% to about 50% bwoc. In still other embodiments wherein the base fluid is water, the base fluid may be present in the cement compositions in the range of from about 38% to about 46% bwoc.

3. Suitable Set Retarders

The cement compositions used in the present invention further comprise a set retarder. A broad variety of set retarders may be suitable for use in the cement compositions used in the present invention. For example, the set retarder may comprise, inter alia, phosphonic acid, phosphonic acid derivatives, lignosulfonates, salts, organic acids, carboxymethylated hydroxyethylated celluloses, synthetic co- or terpolymers comprising sulfonate and carboxylic acid groups, and/or borate compounds. In certain embodiments, the set retarders used in the present invention are phosphonic acid derivatives, such as those described in U.S. Pat. No. 4,676,832, the relevant disclosure of which is hereby incorporated herein. Examples of suitable set retarders include phosphonic acid derivatives commercially available from Solutia Corporation of St. Louis, Mo. under the trade name "DEQUEST." Another example of a suitable set retarder is a phosphonic acid derivative commercially available from Halliburton Energy Services, Inc., of Duncan, Okla., under the trade name "MICRO MATRIX CEMENT RETARDER." Examples of suitable borate compounds include, but are not limited to, sodium tetraborate and potassium pentaborate. A commercially available example of a suitable set retarder comprising potassium pentaborate is available from Halliburton Energy Services, Inc. under the trade name "Component R." Examples of suitable organic acids include, inter alia, gluconic acid and tartaric acid. An example of a suitable organic acid is commercially available from Halliburton Energy Services, Inc. under the trade name "HR® 25." Other examples of suitable set retarders are commercially available from Halliburton Energy Services, Inc. under the trade names "SCR-100" and "SCR-500." Generally, the set retarder is present in the cement compositions used in the present invention in an amount sufficient to delay the setting of the cement composition in a subterranean formation for a desired time. More particularly, the set retarder may be present in the cement compositions used in the present invention in an amount in the range of from about 0.1% to about 10% bwoc. In certain embodiments, the set retarder is present in the cement compositions used in the present invention in an amount in the range of from about 0.5% to about 4% bwoc. One of ordinary skill in the art, with the benefit of this disclosure, will be able to recognize the appropriate amount of set retarder to include in a cement composition for a particular application.

4. Optional Suitable Fluid Loss Control Additives

Optionally, the cement compositions used in the present invention may comprise a fluid loss control additive. A variety of fluid loss control additives may be suitable for use with the present invention, including, inter alia, fibers, flakes, particulate, modified guars, latexes, and acrylamide methyl sulfonic acid copolymers such as those that are further described in U.S. Pat. Nos. 4,015,991; 4,515,635; 4,555,269; 4,676,317; 4,703,801; 5,339,903; and 6,268,406, the relevant disclosures of which are hereby incorporated herein by reference. A suitable acrylamide methyl sulfonic acid copolymer is commercially available from Halliburton Energy Services, Inc. under the trade name "HALAD® 344." Generally, the fluid loss control additive is present in the cement compositions used in the present invention in an amount sufficient to provide a desired degree of fluid loss control. More particularly, the fluid loss control additive may be present in the cement compositions used in the present invention in an amount in the range of from about 0.1% to about 10% bwoc. In certain embodiments, the fluid loss control additive is present in the cement compositions used in the present invention in an amount in the range of from about 0.2% to about 3% bwoc. One of ordinary skill in the art, with the benefit of this disclosure, will be able to recognize the appropriate amount of fluid loss control additive to include in a cement composition for a particular application.

5. Optional Suitable Mechanical Property Modifiers

Optionally, the cement compositions used in the present invention also may include a mechanical-property modifier. Examples of suitable mechanical-property modifiers may include, inter alia, gases that are added at the surface (e.g., nitrogen), gas-generating additives that may generate a gas in situ at a desired time (e.g., aluminum powder or azodicarbonamide), hollow microspheres, elastomers (e.g., elastic particles comprising a styrene/divinylbenzene copolymer), high aspect ratio materials (including, inter alia, fibers), resilient graphitic materials, vapor/fluid-filled beads, matrix-sorbable materials having time-dependent sorption (initiated by, e.g., degradation), mixtures thereof (e.g., mixtures of microspheres and gases), or the like. In certain embodiments of the present invention, the optional mechanical-property modifier may comprise a latex.

In certain optional embodiments wherein microspheres are used as mechanical property modifiers in the cement compositions useful with the present invention, the microspheres may include, but are not limited to, cenospheres that are commercially available from Halliburton Energy Services, Inc. under the trade name "SPHERELITE," as well as hollow glass beads that are commercially available from 3M Corporation under the trade name "SCOTCHLITE." In certain optional embodiments wherein microspheres are added to the cement compositions useful with the present invention, the microspheres may be present in the cement compositions in an amount in the range of from about 5% to about 75% bwoc. In certain embodiments of the present invention, the inclusion of microspheres in the cement compositions useful with the present invention may reduce the density of the cement composition.

In certain optional embodiments wherein one or more gas-generating additives are used as mechanical property modifiers in the cement compositions used in the present invention, the one or more gas-generating additives may comprise, inter alia, aluminum powder that may generate hydrogen gas in situ, or they may comprise azodicarbonamide that may generate nitrogen gas in situ. Other gases and/or gas-generating additives also may be suitable for inclusion in the cement compositions used in the present invention. An example of a suitable gas-generating additive is an aluminum powder that is commercially available from Halliburton Energy Services, Inc. under the trade name "SUPER CBL." SUPER CBL is available as a dry powder or as a liquid additive. Another example of a suitable gas-generating additive is an aluminum powder that is commercially available from Halliburton Energy Services, Inc. under the trade name "GAS-CHEK®." Where included, a gas-generating additive may be present in the cement compositions used in the present invention in an amount in the range of from about 0.1% to about 5% bwoc. In certain embodiments where the gas-generating additive is aluminum powder, the aluminum powder may be present in the cement compositions used in the present invention in an amount in the range of from about 0.1% to about 1% bwoc. In certain embodiments where the gas-generating additive is an azodicarbonamide, the azodicarbonamide may be present in the cement compositions used in the present invention in an amount in the range of from about 0.5% to about 5% bwoc.

In certain optional embodiments wherein one or more gas-generating additives are used as mechanical property modifiers in the cement compositions useful with the present invention, the timing of gas generation may be controlled by, inter alia, encapsulating the gas-generating additive or adding the gas-generating additive in conjunction with a gas-generation-inhibitor, so that the gas-generating additive does not begin to generate a gas until a desired time after placement of the cement composition in the subterranean formation. Examples of suitable encapsulants and gas-generation-inhibitors include, inter alia, surfactants such as sorbitan monooleate or sorbitan trioleate, mineral oil, waxes, and the like. Further information on gas-generation-inhibitors may be found in, inter alia, U.S. Pat. Nos. 4,304,298, 4,340,427, and 4,367,093, the relevant disclosures of which are hereby incorporated by reference. In certain embodiments wherein nitrogen is used as a gas-generating additive, a combination of two compounds may be used, wherein one compound supplies the gas, the other compound comprises an oxidizer, and either compound may be encapsulated. In certain of such embodiments, examples of suitable sources of nitrogen gas include, inter alia, carbohydrazide, and toluene sulfonyl hydrazide. In certain of such embodiments, examples of suitable oxidizers include, inter alia, ammonium persulfate, and sodium chlorite. In certain of such embodiments, examples of suitable encapsulants include, inter alia, a spray-dried latex emulsion that comprises a cross-linker. In certain of such embodiments, examples of suitable gas-generating additives include, inter alia, those that are described in U.S. Pat. Nos. 6,715,553 and 6,722,434, the relevant disclosures of which are hereby incorporated by reference. In certain embodiments wherein a gas is added at the surface to the cement compositions, the gas may be added in an amount sufficient to provide a gas concentration under downhole conditions in the range of from about 0.5% to about 30% by volume of the cement composition. Where included, the gas or gas-generating additive may be added to the cement compositions used in the present invention in a variety of ways, including, but not limited to, dry blending it with the hollow particles, or injecting it into the cement composition as a liquid suspension while the cement composition is being placed within the subterranean formation.

6. Other Optional Components

Optionally, the cement compositions used in the present invention also may include additional suitable additives, including defoaming agents, dispersants, density-reducing additives, surfactants, weighting materials, viscosifiers, fly ash, silica, free water control agents, and the like. An example of a suitable silica is commercially available from Halliburton Energy Services, Inc. under the trade name "SILICALITE." An example of a suitable defoaming agent is commercially available from Halliburton Energy Services, Inc. under the trade name "D-AIR™ 3000 L." An example of a suitable viscosifier is a biopolymer commercially available from Kelco Oilfield Group of Houston, Tex., under the trade name "BIOZAN®." Examples of suitable free water control agents are commercially available from Halliburton Energy Services, Inc. under the trade names "WG-17" and "FWCA." An example of a suitable dispersant is commercially available from Halliburton Energy Services, Inc. under the trade name "CFR-3." Examples of suitable weighting materials include, inter alia, hematite that is commercially available from Halliburton Energy Services, Inc. under the trade name "HI-DENSE," sand, barite, and a weighting agent that is commercially available from Halliburton Energy Services, Inc. under the trade name "MICRO MAX." Any suitable additive may be incorporated within the cement compositions used in the present invention. One of ordinary skill in the art, with the benefit of this disclosure, will be able to recognize where a particular additive is suitable for a particular application.

7. Sample Formulations of the Delayed-Set Cement Compositions Useful with the Present Invention An example of a cement composition useful in accordance with the present invention comprises: a hydraulic cement, 41% water bwoc, 18% sodium chloride by weight of the water ("bwow"), 0.5% of a HALAD®344 additive bwoc, and 1% MICRO MATRIX CEMENT RETARDER bwoc. Another example of a cement composition useful in accordance with the present invention comprises a hydraulic cement, 46% water bwoc, 2% calcium chloride bwoc, and 0.5% HALAD®344 bwoc; such formulation may be particularly useful for relatively shallow applications. Another example of a cement composition useful in accordance with the present invention comprises a hydraulic cement, 38% water bwoc, 18% sodium chloride by weight of the water, and 0.5% HALAD®344 bwoc; such formulation may be particularly useful for medium-depth applications. Another example of a cement composition useful in accordance with the present invention comprises a hydraulic cement, 53% water bwoc, 35% silica bwoc, 25% HI-DENSE No. 4 bwoc, 1% SCR-100 bwoc, and 0.5% HALAD®413 bwoc; such formulation may be particularly useful for relatively deep applications, or for high-temperature applications.

B. Suitable Activators and Activator-encapsulants

In an embodiment of a method of the present invention, the delayed-set cement compositions useful in the present invention are permitted to remain in a slurry state for a desired time before being activated through contact with an activator that is present on an outer surface of an improved casing string of the present invention.

1. Suitable Activators

Examples of suitable activators include, but are not limited to: sodium hydroxide, sodium carbonate, amine compounds; and salts comprising calcium, sodium, magnesium, aluminum, or a mixture thereof. An example of a suitable calcium salt is calcium chloride. Examples of suitable sodium salts are sodium chloride, sodium aluminate, and sodium silicate. An example of a suitable magnesium salt is magnesium chloride. Examples of suitable amine compounds are triethanol amine, tripropanol amine, tri-isopropanol amine, and diethanol amine. The amount of activator generally required is an amount that is sufficient to cause the cement composition to set within a time in the range of from about 1 minute to about 2 hours after contacting the activator. In certain embodiments wherein the activator is sodium chloride, the desired effective concentration may be in the range of from about 3% to about 15% by weight of the water in the cement composition. In certain embodiments wherein the activator is calcium chloride, the desired effective concentration may be in the range of from about 0.5% to about 5% by weight of the water in the cement composition.

In certain embodiments of the present invention wherein the cement composition is intended to set before entering the inner diameter of the casing string, the required amount of activator may be an amount that is sufficient to cause the cement composition to "flash-set." As referred to herein, the term "flash-set" will be understood to mean the irreversible setting of a cement composition within a time in the range of from about 1 minute to about 5 minutes after contacting an activator. Generally, any of the above-mentioned activators (and their equivalents) may be suitable for use in embodiments of the present invention wherein flash-setting of a cement composition is desired. In certain embodiments of the present invention wherein the cement composition is intended to flash-set, activators that may be particularly suitable may include, inter alia, sodium hydroxide, sodium carbonate, potassium carbonate, bicarbonate salts of sodium or potassium, sodium silicate salts, sodium aluminate salts, ferrous and ferric salts (e.g., ferric chloride and ferric sulfate), polyacrylic acid salts, and the like. In certain embodiments of the present invention, activators such as calcium nitrate, calcium acetate, calcium chloride, and calcium nitrite may be used to cause the cement composition to flash-set, though the concentration of these activators that may be required in order to cause such flash-setting may be greater than the concentration required for the other activators described herein, and their equivalents. One of ordinary skill in the art, with the benefit of this disclosure, will be able to identify an activator concentration sufficient to cause flash-setting of a cement composition.

In certain embodiments, the flash-activator may be used in solid form. In certain embodiments wherein a solid flash-activator is used that may form a high-pH solution when exposed to water, the solid flash-activator may be encased or encapsulated within a base-hydrolyzable cladding or coating, or a base-hydrolyzable bag.

In certain embodiments of the present invention, an activator may be disposed along a portion of an outer surface of an improved casing string of the present invention in a concentration that is sufficient to cause a cement composition to set within about 1 hour to about 2 hours after contacting the activator, and the same, or different activator may be disposed along a lower portion of an outer surface of the casing string (e.g., at a location about, or above, circulation ports 14 in FIG. 1), in a concentration that is sufficient to cause a leading edge of the cement composition to flash set before arriving at, e.g., circulation ports 14 in FIG. 1, which may prevent any of the cement composition from penetrating the inner diameter of the casing string. The portion of the cement composition behind the leading edge then may set within about 1 minutes to about 2 hours afterward.

2. Suitable Activator-Encapsulants

In certain embodiments, the activator may comprise an outer coating that is dissolved by a compound that is only present within the cement composition, and not in the subterranean formation or any other fluid that may contact the casing string in the subterranean formation. Examples of suitable activator-encapsulants that may be dissolved or degraded by the elevated pH of the cement composition include, inter alia, thermoplastic materials that comprise base-hydrolyzable functional groups (e.g., esters, amides, and anhydride groups). Examples of suitable thermoplastic materials include, inter alia, polyesters (e.g., polyethylene terephthalate), 3-hydroxybutyrate/3-hydroxyvalerate copolymer, polymers comprising lactic acid or glycolic acid, polycaprolactone, polyethylene succinate, polybutylene succinate, poly(ethylene vinylacetate), poly(vinylacetate), polymers comprising dioxanone, cellulose esters, oxidized-ethylene-carbon-monoxide polymers, polyglycine, polycaprolactam, poly(gamma-glutamic acid), polyurethanes, polymers comprising bisphenol-A, polyamides (e.g., nylon 6/6), and the like. An example of a suitable polyester is commercially available from Union Carbide Corporation under the trade name "TONE." In certain embodiments, the activator-encapsulant may comprise latex compositions comprising crosslinkers that may be spray-dried onto the activator and may become crosslinked during the process, and that may swell and become porous upon exposure to fluids having an elevated pH. In certain embodiments of the present invention wherein an encapsulated activator may be applied to the outer side of a casing string by attaching base-degradable plastic bags containing the activator to the outer side of the casing string, the base-degradable plastic bags may be made from any of the abovementioned thermoplastic materials that comprise base-hydrolyzable functional groups.

Examples of suitable activator-encapsulants that may be dissolved or degraded by a compound that may be present in the cement composition (e.g., an oxidizer that may be included in the cement composition as, e.g., a surfactant), include, inter alia, polymers that comprise oxidizable monomers (e.g., butadiene). Examples of suitable polymers that comprise butadiene include, inter alia, styrene-butadiene copolymers, butadiene acrylonitrile copolymers, and the like. In certain embodiments wherein the activator-encapsulant comprises an oxidizable monomer, suitable oxidizers that may be added to the cement composition may include, inter alia, sodium or potassium persulfate, sodium perborate, sodium peroxide, sodium hypochlorite, sodium chlorite, and the like.

3. Activation By Heat

Optionally, the cement composition may be activated by heat that may be induced within the subterranean formation. In certain of these optional embodiments, the activator may be present on the outer circumference of the pipe string to be cemented in the formation, and heat may be induced within the subterranean formation through the use of ultrasonic energy, chemical reactions, radio waves, or an electrical current that may be generated within the subterranean formation. Examples of tools that may be suitable for generating heat in the subterranean formation include, inter alia, an induction-heating tool that is described in IADC/SPE 87198, the relevant disclosure of which is hereby incorporated by reference. In certain embodiments, heat may be generated in the subterranean formation through the use of a downhole choke, as described in IADC/SPE 87217, the relevant disclosure of which is hereby incorporated by reference.

4. A Sample Calculation Illustrating the Determination of a Suitable Depth of Activator on the Outside of a Casing String In certain embodiments wherein an activator is present on the outer circumference of a casing string that may be placed in a subterranean formation, the amount of activator that may be applied to the casing string may be determined as illustrated in the following example:

In this hypothetical example, Class A cement is mixed with 5.2 gallons of water per sack of cement (equal to about 43% bwoc), to provide a cement composition having a density of 15.6 pounds per gallon and a yield of 1.20 $ft^3$/sack.

For purposes of this hypothetical example, an activator concentration of 0.5% bwoc is desired. Given that a sack of Class A cement is known to weigh about 94 pounds, the activator must be present on the outer circumference of the casing string in an amount sufficient to deliver 0.47 pounds of activator per sack of cement.

For purposes of this hypothetical example, assume that the outer diameter of the casing string is 13⅜ inches, and that the annulus (between the walls of the formation and the casing string's outer diameter) has a diameter of 17½ inches. The unit volume of this annulus may be calculated to be 1.4396 linear feet per cubic foot of volume.

Accordingly, 1 sack of Class A cement yielding 1.2 $ft^3$ of slurry per sack would fill 1.7275 feet of annular space. Because the desired activator concentration, expressed in pounds per sack, was determined above to be 0.47 pounds of activator per sack, the mass of activator required per foot of casing string is equal to (0.47 pounds per sack)/(1.7275 feet of casing string per sack), which equals 0.27243 pounds of activator per foot of casing string.

C. Cement Compositions Comprising High Aluminate Cements and/or Phosphate Cements Certain embodiments of the cement compositions useful in the present invention that comprise high aluminate cements and/or phosphate cements also may be used without a set retarder. In certain of these embodiments, a component of the cement composition (e.g., sodium polyphosphate) may be selected as an "initiator." As referred to herein, the term "initiator" will be understood to mean a component whose presence in a cement composition comprising a high aluminate cement or a phosphate cement is required to cause setting of such cement compositions. Examples of initiators that may be suitable for use with high aluminate cement compositions include, inter alia, sodium polyphosphate. Examples of initiators that may be suitable for use with cement compositions comprising phosphate cements include, inter alia, alkali metal phosphate salts. In these embodiments of the present invention, the component selected as the initiator intentionally will be withheld from the high alumina or phosphate cement composition during its formulation, which may result in the formulation of a high alumina or phosphate cement composition that cannot set until contacted with the initiator. In certain of these embodiments, the initiator component then may be disposed along an outer surface of an improved casing string of the present invention.

When a cement composition comprising a high aluminate cement is used with the present invention, the high aluminate cement may comprise calcium aluminate in an amount in the range of from about 15% to about 45% by weight of the high aluminate cement, Class F fly ash in an amount in the range of from about 25% to about 45% by weight of the high aluminate cement, and sodium polyphosphate in an amount in the range of from about 5% to about 15% by weight of the high aluminate cement. Cement compositions comprising such high aluminate cements are described in, inter alia, U.S. Pat. No. 6,332,921, the relevant disclosure of which is hereby incorporated herein by reference. In certain embodiments of the present invention wherein an initiator is used in conjunction with a cement composition comprising a high aluminate cement, one or more of the components of the high aluminate cement (e.g., sodium polyphosphate) may be withheld from the formulation of the cement composition in order to be used as initiators, e.g., one or more of the components of the high aluminate cement (e.g., sodium polyphosphate) may be withheld from the formulation of the cement composition, and may be placed on the outer circumference of the casing string, so as to contact the cement composition and cause it to set. For example, in certain embodiments of the present invention, a cement composition may be formulated that comprises calcium aluminate and Class F fly ash, but that does not comprise sodium polyphosphate; such cement composition then may be flowed into the subterranean formation so as to contact the initiator (sodium polyphosphate, in this example), disposed on the outside of the casing string. In certain embodiments of the present invention, the one or more initiators may be placed on the outer circumference of the casing string in an injector system to be injected into the remainder of the cement composition at a desired time.

An example of a suitable phosphate cement comprises magnesium oxide and alkali metal phosphate salts, and is described in U.S. Pat. No. 6,204,214, the relevant disclosure of which is hereby incorporated by reference. In certain embodiments of the present invention wherein a cement composition comprising a phosphate cement is used, a reactive component of the cement composition (e.g., the alkali metal phosphate salt) may be used as an initiator, e.g., the reactive component may be placed on the outer circumference of the casing string so as to contact the cement composition and cause it to set. In certain embodiments of the present invention, the initiator may be placed on the outer circumference of the casing string in an injector system to be injected into the remainder of the cement composition at a desired time.

D. Example Methods of the Present Invention

Referring now to FIG. 1, a cross sectional side view of a well bore is illustrated therein. Surface casing 2, having well head 3 attached thereto, is installed in well bore 1. Casing 4 is suspended from well head 3 to the bottom of the rat hole in well bore 1. Annulus 5 is defined between casing 4 and well bore 1. Annulus flow line 6 fluidly communicates with annulus 5 through well head 3 and/or surfacing casing 2. Annulus valve 7 and annulus pump 8 are connected in annulus flow line 6. Pump truck 13 is connected to annulus pump 8 via truck hose 9. ID flow line 11 is connected to well head 3 to allow fluid communication with the inner diameter of casing 4. ID valve 12 is connected in ID flow line 11. At the lower most end of casing 4, circulation ports 14 are formed in the walls of casing 4 to allow fluid communication between annulus 5 and the inner diameter of casing 4. Casing shoe 10 is connected to the bottom of casing 4. Activator 15 is resident and exposed on the exterior surface of casing 4 between well head 3 and circulation ports 14.

Activator 15 may be placed on the outer surface of casing 4 in a variety of ways. For example, activator 15 may be sprayed onto the outer surface of a section of casing 4 while the section resides in, e.g., a pipe rack. Or, for example, activator 15 may be sprayed onto the outer surface of a section of casing 4 while the sections are made up and run into well bore 1. In certain of such embodiments, activator 15 may be a solid particle that becomes embedded in the outer surface of casing 4 as a result of the spraying process, or activator 15 may be part of a liquid solution that dries on the outside of casing 4. In certain of such embodiments, activator 15 may further be mixed with an adhesive compound before being sprayed onto the outer surface of casing 4. Examples of suitable adhesives may include, inter alia: a variety of latexes (e.g., latexes that are styrene-butadiene-based, acrylate-based, acrylonitrile-based, and vinylacetate-based) comprising appropriate crosslinkers; phenolic resins comprising curing agents; adhesive formulations comprising polyvinylacetate; and the like. In another embodiment, activator 15 may be affixed to one side of a substrate (e.g., double-sided tape) that is attached to the outer surface of casing 4. For example, a first side of a supply of double-sided tape may be rolled in a suitable activator 15, then a second side may be affixed to the outer surface of casing 4.

In certain alternative embodiments of the invention, activator 15 is applied to the exterior of the casing, and a suitable activator-encapsulant then is applied over activator 15. In certain of these embodiments, the activator-encapsulant may be dissolved or degraded by either the elevated pH of a cement composition, or by a compound present in the cement composition (e.g., an oxidizer present in the cement composition) that is capable of dissolving or degrading the activator-encapsulant, to thereby expose activator 15. In certain embodiments of the present invention, activator 15 may be applied to the outer side of casing 4 by any suitable method, including, for example, by encapsulation within base-degradable plastic bags, and subsequent attachment of such base-degradable plastic bags containing activator 15 to the outer side of the casing string. Examples of suitable base-degradable materials previously have been described in greater detail herein.

A cement composition is pumped into annulus 5 by pump truck 13 and annulus pump 8. Suitable cement compositions previously have been described in greater detail herein. The cement composition flows into annulus 5 from annulus flow line 6 while fluid returns are taken from the inner diameter of casing 4 through ID flow line 11. Thus, fluid flows through well bore 1 in a reverse circulation direction. As the cement composition flows down annulus 5, it contacts activator 15 on the exterior of casing 4. Activator 15 activates the cement composition to allow the cement composition to set in the annulus 5, as previously described. In certain embodiments of the present invention, substantially the entirety of the cement composition sets in annulus 5, and only a limited portion, if any, of the cement composition enters the inner diameter of casing 4. In certain embodiments of the present invention, the entirety of the cement composition sets in annulus 5, and no portion of the cement composition enters the inner diameter of casing 4.

FIG. 2A illustrates a cross sectional side view of a well bore having a casing configuration similar to that described in FIG. 1. In particular, activator 15 is applied to the exterior surfaces of casing 4. In FIG. 2A, cement composition 16 is shown flowing into annulus 5 from annulus flow line 6. FIG. 2B is a cross sectional side view of the well bore shown in FIG. 2A. In this illustration, cement composition 16 has flowed all the way down annulus 5 to a position just above circulation ports 14. According to one embodiment of the invention, cement composition 16 mixes with activator 15 throughout its descent in annulus 5. Cement composition 16 and activator 15 are formulated so that the leading edge of cement composition 16 begins to set in annulus 5 as it approaches circulation ports 14. As the leading edge of cement composition 16 begins to set, fluid flow through the well bore becomes restricted and eventually ceases. Thus, cement composition 16 is prevented from flowing into the inner diameter of casing 4 through circulation ports 14 because cement composition 16 has set before reaching circulation ports 14. The remainder of cement composition 16 sets in annulus 5 behind the leading edge.

Figure 3:
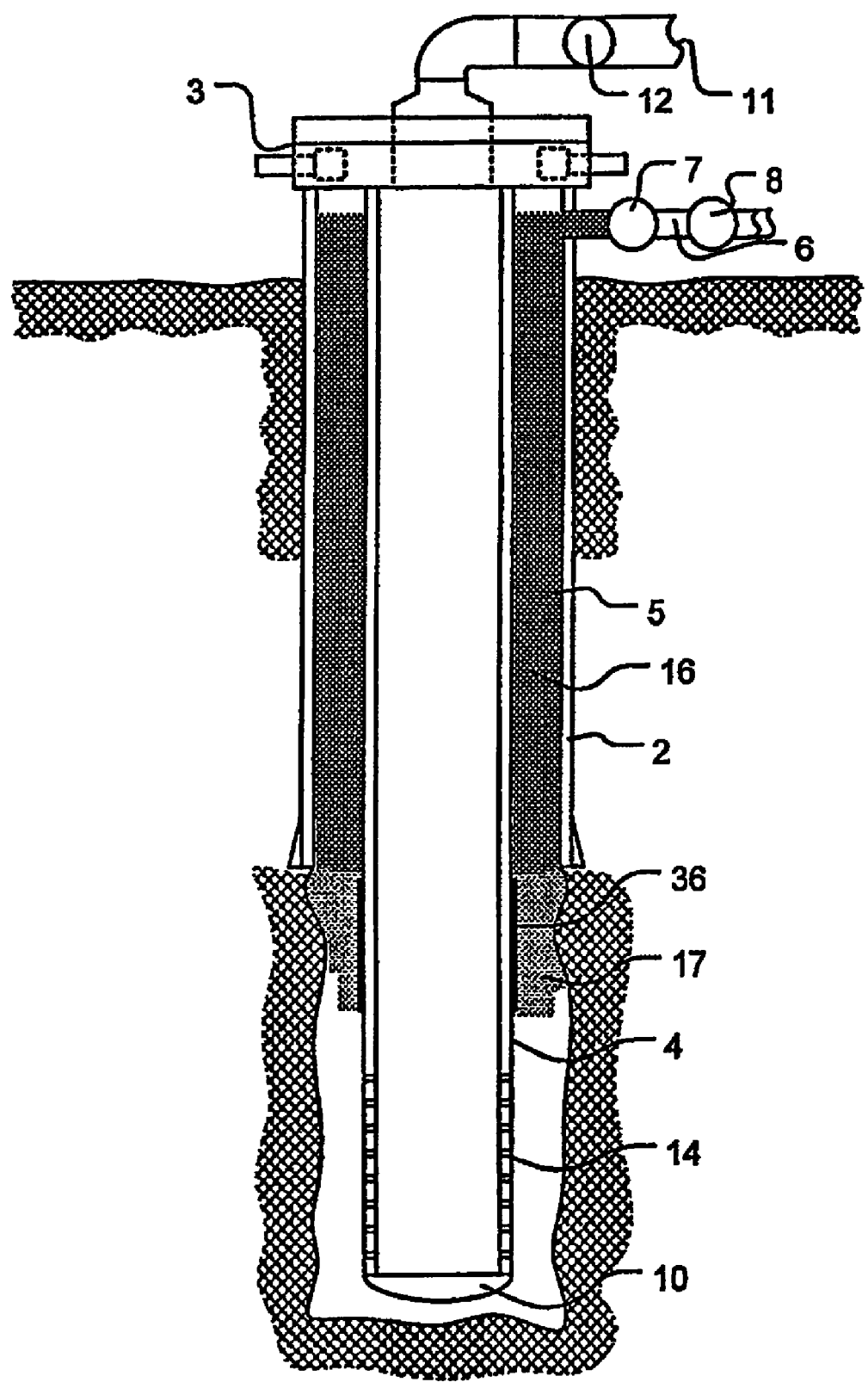
FIG. 3 illustrates a cross sectional side view of a well bore.

Referring now to FIG. 3, a cross sectional side view is shown of a well bore having an alternative activator configuration. Similar to the previously illustrated well bores, surface casing 2 is set in the well bore and has well head 3 attached thereto where surface casing 2 extends above the surface. Casing 4 is suspended in the well bore from well head 3. Annulus 5 is defined between the well bore and casing 4. At its lower end, casing 4 has circulation ports 14 and casing shoe 10. Annulus flow line 6 fluidly communicates with annulus 5 through surface casing 2 and/or well head 3. ID flow line 11 is connected to well head 3 to fluidly communicate with the inner diameter of casing 4. In the illustrated embodiment, activator 15 is applied to the exterior surface of casing 4 immediately above circulation ports 14.

In the embodiment illustrated in FIG. 3, a cement composition flows down annulus 5. Returns are taken from the inner diameter of casing 4 through ID flow line 11 to establish fluid flow through the well bore in a reverse circulation direction. A first portion 17 of the cement composition contacts activator 36 once first portion 17 of the cement composition has flowed down annulus 5 to the point immediately above circulation ports 14 where activator 36 has been applied. Suitable activators 36 previously have been described. In certain embodiments of the present invention wherein the cement composition flowing down annulus 5 comprises a high aluminate cement or a phosphate cement, activator 36 may comprise an initiator. For example, where the cement composition flowing down annulus 5 comprises a high aluminate cement, activator 36 may comprise, inter alia, sodium polyphosphate. For example, where the cement composition flowing down annulus 5 comprises a phosphate cement, activator 36 may comprise an alkali metal phosphate salt, or the like.

In the embodiment illustrated in FIG. 3, activator 36 has been applied in a concentration sufficient to cause first portion 17 of the cement composition to flash-set upon contact with activator 36. Accordingly, upon contact with activator 36, first portion 17 of the cement composition immediately flash sets in annulus 5 to restrict or prevent fluid flow through the well bore, thereby preventing remaining portion 16 of the cement composition from flowing through circulation ports 14 into inner diameter of the casing 4. Remaining portion 16 of the cement composition above first portion 17 of the cement composition is therefore suspended in annulus 5. Remaining portion 16 of the cement composition then may be allowed to set, harden or solidify according to a normal timetable as is known in the art.

Figure 4A:
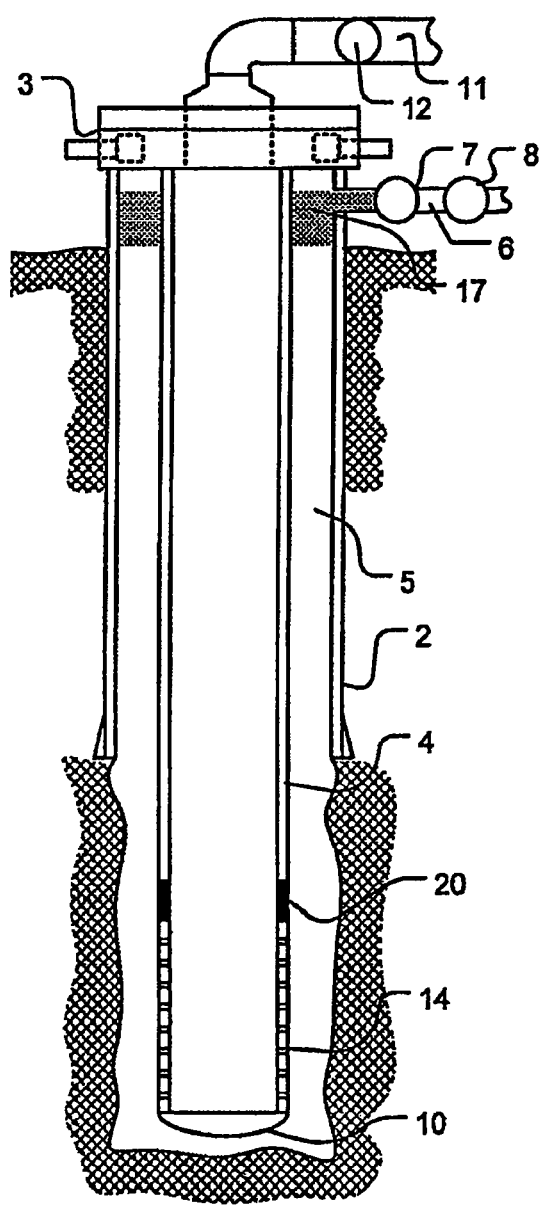
FIG. 4A illustrates a cross sectional side view of a well bore.
Figure 4B:
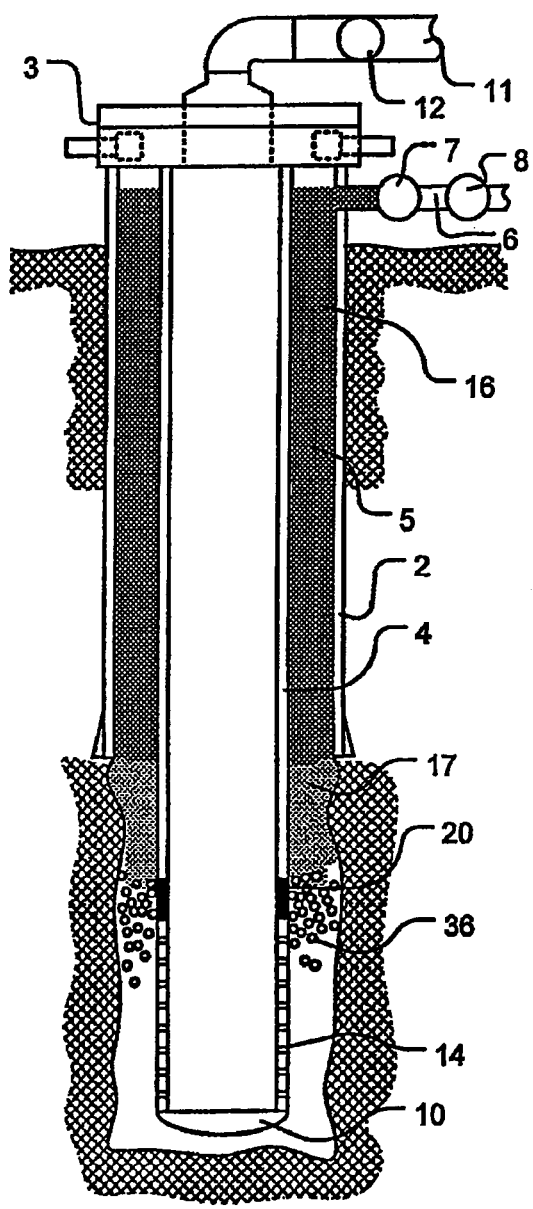
FIG. 4B illustrates a cross sectional side view of a well bore.

FIGS. 4A and 4B illustrate cross sectional side views of a well bore similar to those previously described. As before, casing 4 is suspended in the well bore from well head 3, which is attached to surface casing 2. Injector 20 may be present in casing 4 above circulation ports 14. In certain embodiments of the present invention, injector 20 may contain activator 36, present in an amount sufficient to cause a cement composition to flash set upon contact with activator 36. Injector 20 may release activator 36 into annulus 5. Suitable activators 36 previously have been described. In certain embodiments of the present invention wherein the cement composition comprises a high aluminate cement or a phosphate cement, activator 36 may comprise an initiator. For example, where the cement composition comprises a high aluminate cement, activator 36 may comprise, inter alia, sodium polyphosphate. For example, where the cement composition flowing down annulus 5 comprises a phosphate cement, activator 36 may comprise an alkali metal phosphate salt, or the like.

As shown in FIG. 4A, a first portion 17 of a cement composition is injected into annulus 5 through annulus flow line 6. As shown in FIG. 4B, a remaining portion 16 of the cement composition is pumped down annulus 5, such that remaining portion 16 of the cement composition is present behind first portion 17. First portion 17 and remaining portion 16 are pumped down the annulus until first portion 17 contacts injector 20. When injector 20 is contacted by first portion 17, injector 20 injects activator 36 into the annulus to mix with first portion 17. Activator 36 causes first portion 17 to immediately flash set in the annulus. When first portion 17 of the cement composition flash sets in the annulus, fluid flow through the annulus is restricted or stopped, thereby causing remaining portion 16 of the cement composition to become suspended in the annulus. The suspended remaining portion 16 of the cement composition then may set in annulus 5 according to a normal time schedule.

Figure 5A:
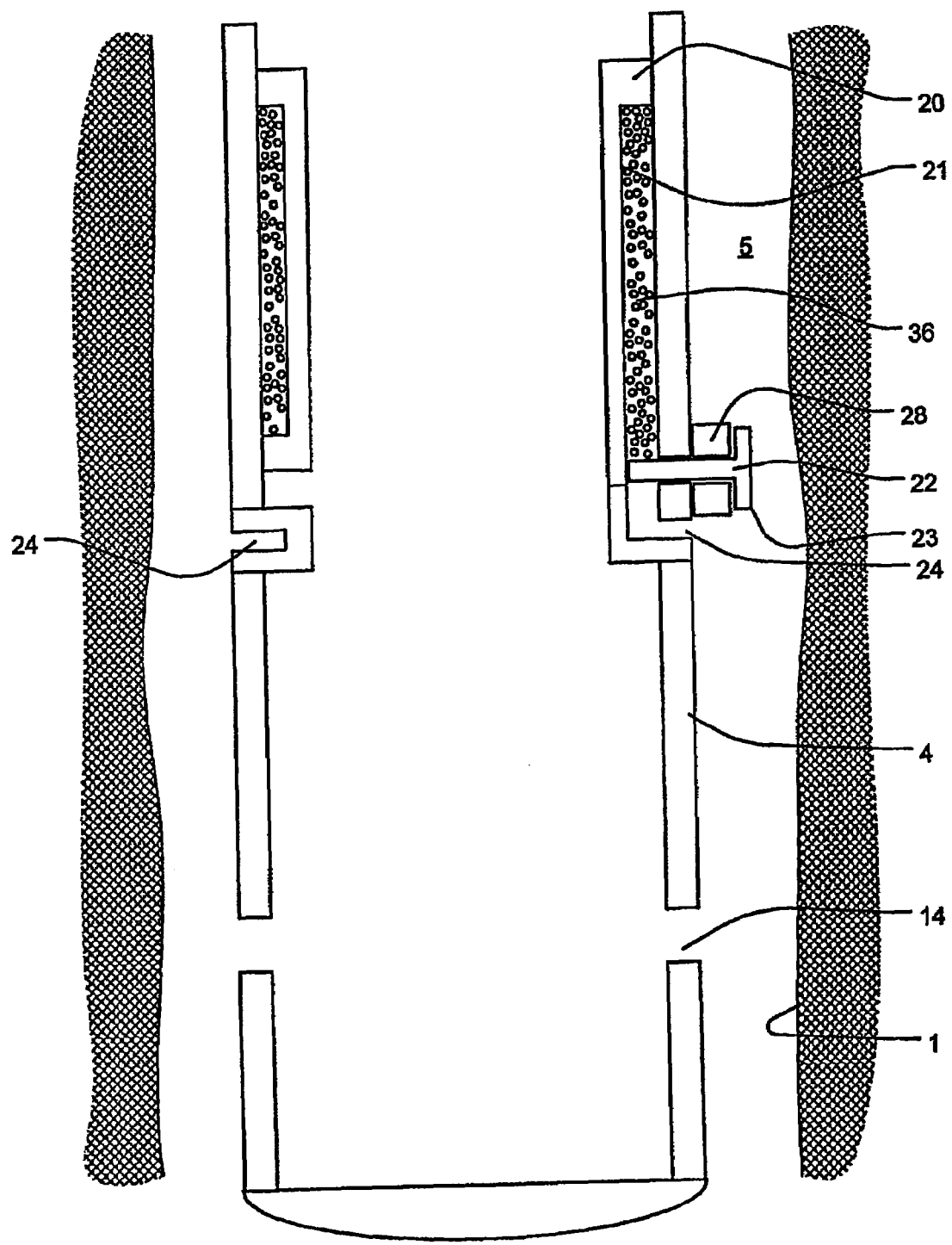
FIG. 5A illustrates a cross sectional side view of an embodiment of an injector in a well bore.

FIG. 5A illustrates a cross sectional side view of the injector identified in FIGS. 4A and 4B. Injector 20 is made up to casing 4 above circulation ports 14. In the embodiment illustrated in FIG. 5A, injector 20 comprises chamber 21, which is filled with activator 36, present in an amount sufficient to cause a cement composition to flash set upon contact with activator 36. Suitable activators 36 previously have been described. In certain embodiments of the present invention wherein the cement composition comprises a high aluminate cement or a phosphate cement, activator 36 may comprise an initiator. Chamber 21 is pressurized at the surface such that when it is run into the well bore, the pressure inside chamber 21 exceeds the hydrostatic fluid pressure in annulus 5. Chamber 21 is closed by pressure pin 22, which prevents activator 36 from bleeding out of chamber 21. Pressure pin 22 has a head 23. Reactive material 28 is positioned between casing 4 and head 23 of pressure pin 22. Injector 20 also has injector ports 24 for injecting activator 36 into annulus 5 upon pressure release by pressure pin 22.

Figure 5B:
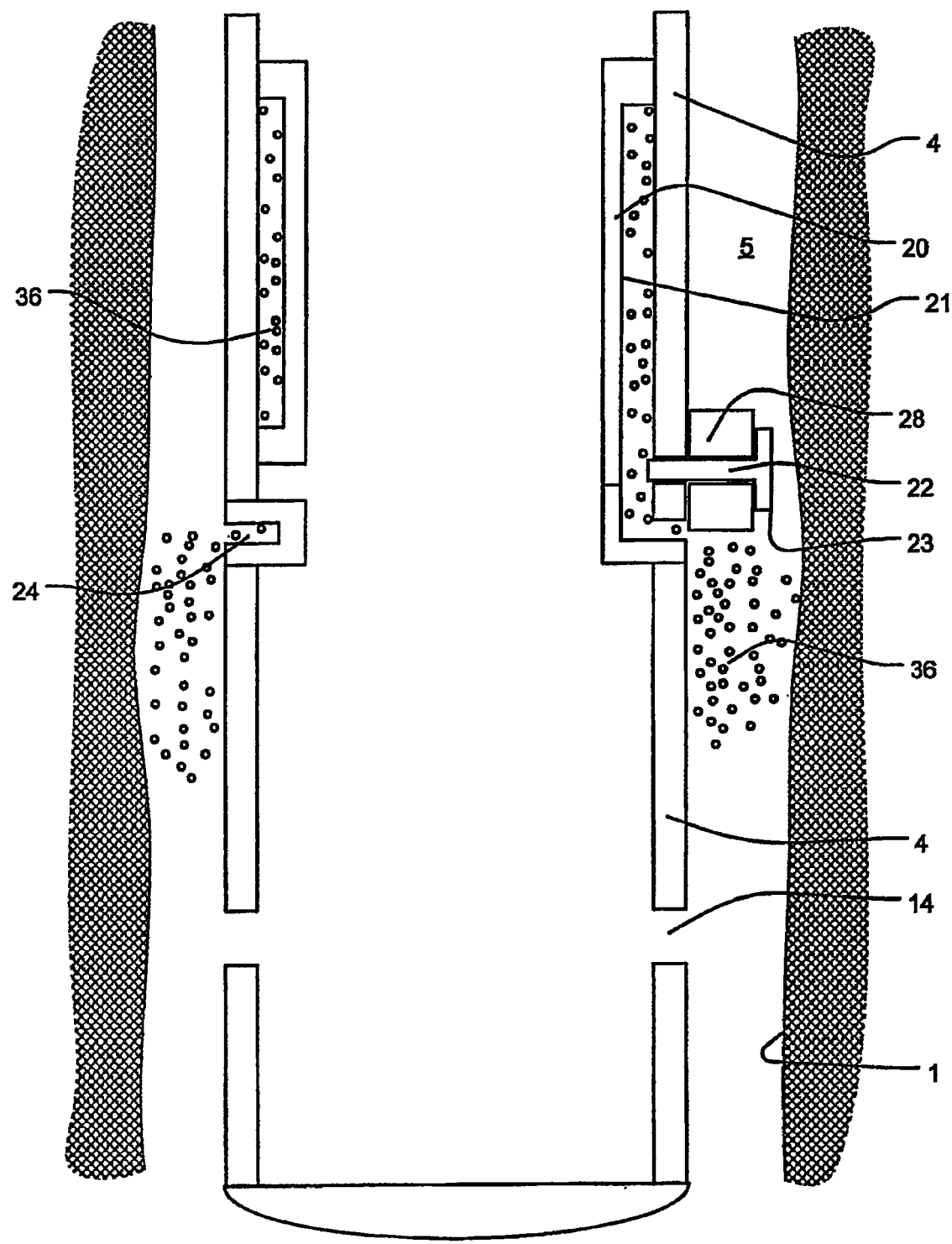
FIG. 5B illustrates a cross sectional side view of an embodiment of an injector and well bore of FIG. 5A.

FIG. 5B illustrates a cross sectional side view of the injector and well bore shown in FIG. 5A. While the illustration in FIG. 5A shows injector 20 in a closed configuration, FIG. 5B illustrates injector 20 in an open configuration. In particular, reactive material 28 has expanded to pull pressure pin 22 from chamber 21. Thus, activator 36 in chamber 21 is released past pressure pin 22 to flow through injector ports 24 into annulus 5. According to this embodiment, the cement composition that will be flowed downhole comprises a reactive component that reacts with reactive material 28 to cause it to expand. Thus, reactive material 28 acts as a trigger for injector 20 when a cement composition contacts the trigger. As previously described, activator 36 is contacted by the cement composition, thereby causing the cement composition to flash set in annulus 5. In certain embodiments, reactive material 28 may be a gas-generating additive such as those that previously have been described herein.

Injector 20 also may be opened by any number of tag materials perceptible by a sensor (not shown) on, or adjacent to, injector 20. For example, magnetic tag markers, pH markers, radioactive markers, luminescent markers, or any other marker (e.g., walnut shells) known to persons of skill in the art may be used to open injector 20.

Figure 6A:
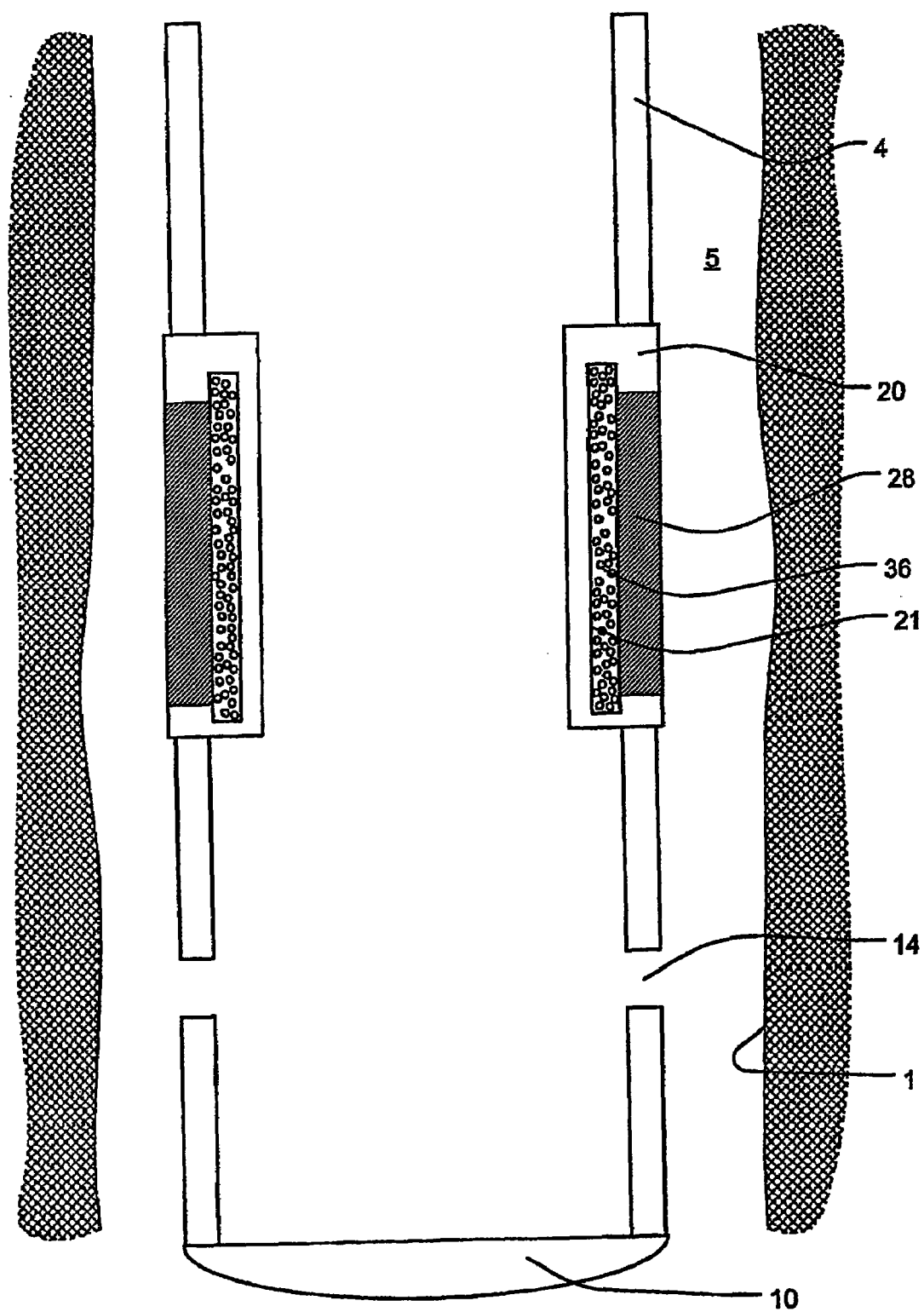
FIG. 6A illustrates a cross sectional side view of an embodiment of an injector in a well bore.

FIG. 6A illustrates a cross sectional side view of an injector identified in FIGS. 4A and 4B. Injector 20 is made up in casing 4 above circulation ports 14. Injector 20 comprises chamber 21, wherein activator 36 is contained within chamber 21. Activator 36 generally will be present in an amount sufficient to cause flash-setting of a cement composition that subsequently may contact activator 36. Suitable activators 36 previously have been described. In certain embodiments of the present invention wherein the cement composition to be flowed into the well bore comprises a high aluminate cement or a phosphate cement, activator 36 may comprise an initiator. Reactive material 28 seals chamber 21.

Figure 6B:
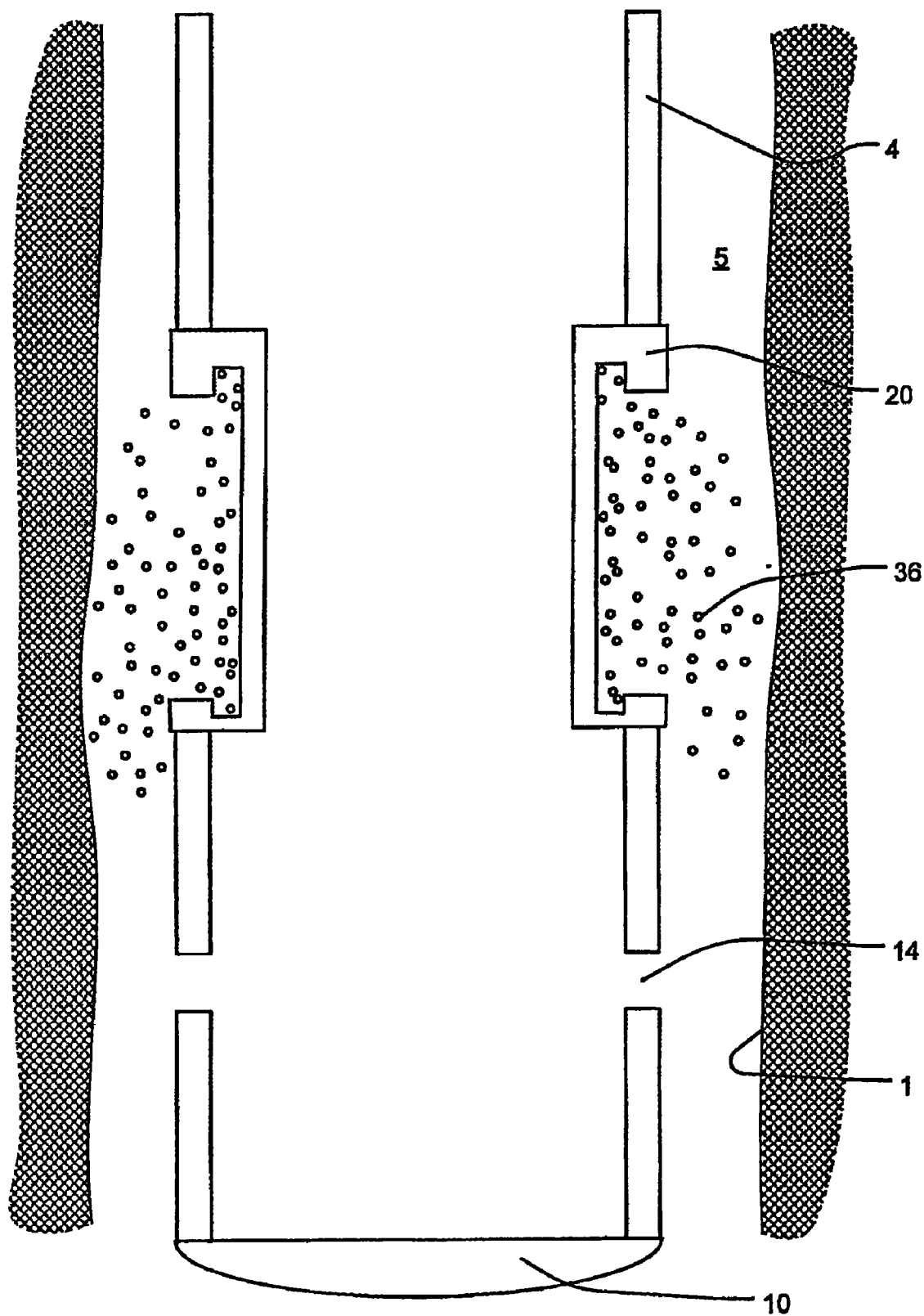
FIG. 6B illustrates a cross sectional side view of an embodiment of an injector and well bore shown in FIG. 6A.

FIG. 6B illustrates a cross sectional side view of the injector and casing shown in FIG. 6A. In FIG. 6A, the injector is shown in a closed configuration, while in FIG. 6B, the injector is illustrated in an open configuration. In particular, in FIG. 6B, reactive material 28 has dissolved or eroded away from injector 20 to release activator 36 into annulus 5. In this embodiment, a cement composition (not shown) may be injected down the annulus until it contacts reactive material 28 (see FIG. 6A). Upon contact with reactive material 28, a reactive catalyst in the cement composition may dissolve or erode the reactive material so as to expose or release activator 36 contained in chamber 21.

Figures 7A, 7B, 7C:
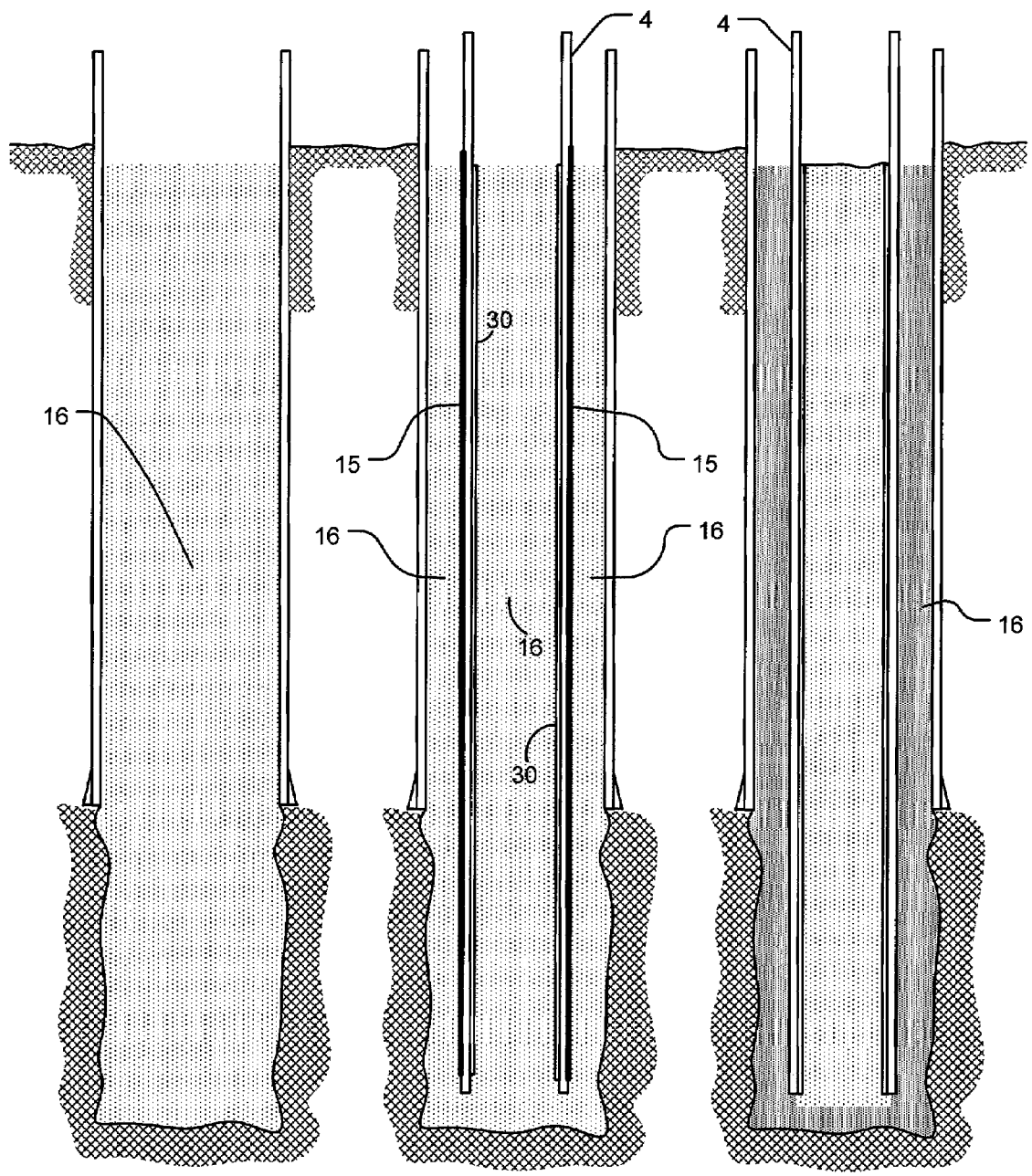
FIG. 7A illustrates a cross sectional side view of a well bore.
FIG. 7B illustrates a cross sectional side view of the well bore shown in FIG. 7A.
FIG. 7C illustrates a cross sectional side view of the well bore shown in FIGS. 7A and 7B.

FIG. 7A illustrates a cross-sectional side view of a well bore comprising a cement composition 16. In certain embodiments of the present invention, cement composition 16 may have been placed in the subterranean formation shortly after the drilling of the well bore therein. After placement of cement composition 16, casing string 4 is placed in the well bore, as illustrated in FIGS. 7B and 7C. Generally, casing string 4 comprises activator 15 on an outer surface thereof. In certain embodiments of the present invention, casing string 4 optionally may comprise retarder 30 on an inside surface thereof. As casing string 4 is placed in the well bore, cement composition 16 and activator 15 contact each other so as to activate the portion of cement composition 16 disposed in the annulus between the outer surface of casing string 4 and the walls of the well bore. The portion of cement composition 16 disposed in the annulus between the outer surface of casing string 4 and the walls of the well bore then is permitted to set in the well bore. In certain embodiments of the present invention, the presence of optional retarder 30 on an inside surface of casing string 4 may prevent the portion of cement composition 16 disposed within the inner diameter of casing string 4 from setting for a desired period of time.

Figures 8A, 8B, 8C:
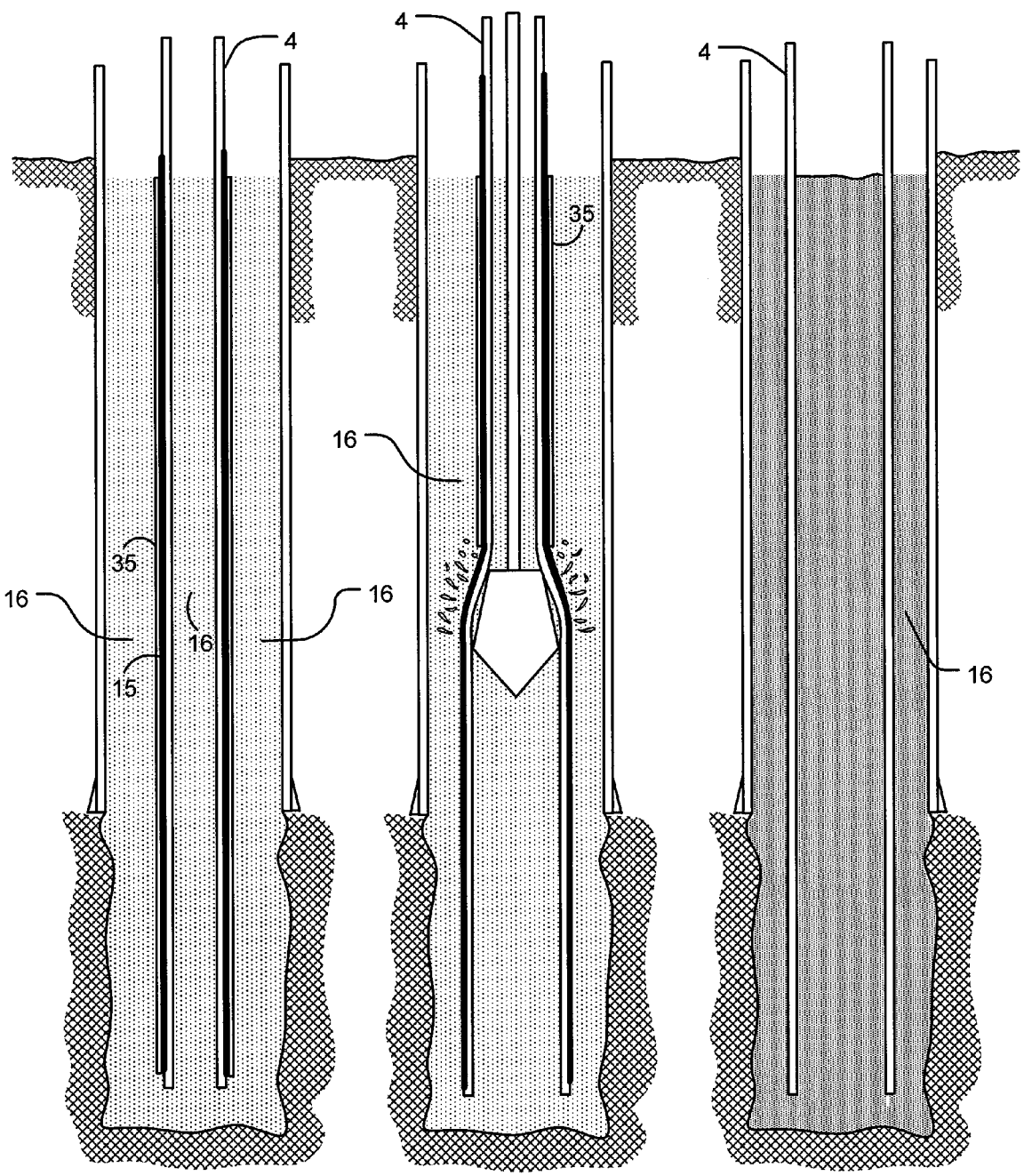
FIG. 8A illustrates a cross sectional side view of a well bore.
FIG. 8B illustrates a cross sectional side view of the well bore shown in FIG. 8A.
FIG. 8C illustrates a cross sectional side view of the well bore shown in FIGS. 8A and 8B.

FIGS. 8A-8C illustrate a cross-sectional side view of a well bore comprising a cement composition 16. In certain embodiments of the present invention, cement composition 16 may have been placed in the subterranean formation shortly after the drilling of the well bore therein. After placement of cement composition 16, casing string 4 is placed in the well bore. Generally, casing string 4 comprises activator 15 on an outer surface thereof. Generally, activator 15 will be encapsulated in a suitable activator-encapsulant 35. Next, as illustrated in FIG. 8B, casing string 4 may be deformed sufficient to degrade activator-encapsulant 35, thereby exposing activator 15 to the cement composition. In certain embodiments of the present invention, casing string 4 may comprise an expandable tubular that may be expanded (e.g., by means known in the art, such as a back-reamer), which may fracture or degrade activator-encapsulant 35, thereby permitting contact between activator 15 and cement composition 16. Suitable expandable tubulars are commercially available from, inter alia, Enventure Global Technology, Inc., of Houston, Tex. Expandable tubulars are further described in, inter alia, CINC Paper 2003-136, "The Development and Applications of Solid Expandable Tubular Technology," by G. L. Cales, the relevant disclosure of which is hereby incorporated by reference. FIG. 8C illustrates the well bore comprising the expanded casing string 4, with cement composition 16 on either side of it, cement composition 16 having set at a desired time after contact with activator 15.

Figure 9:
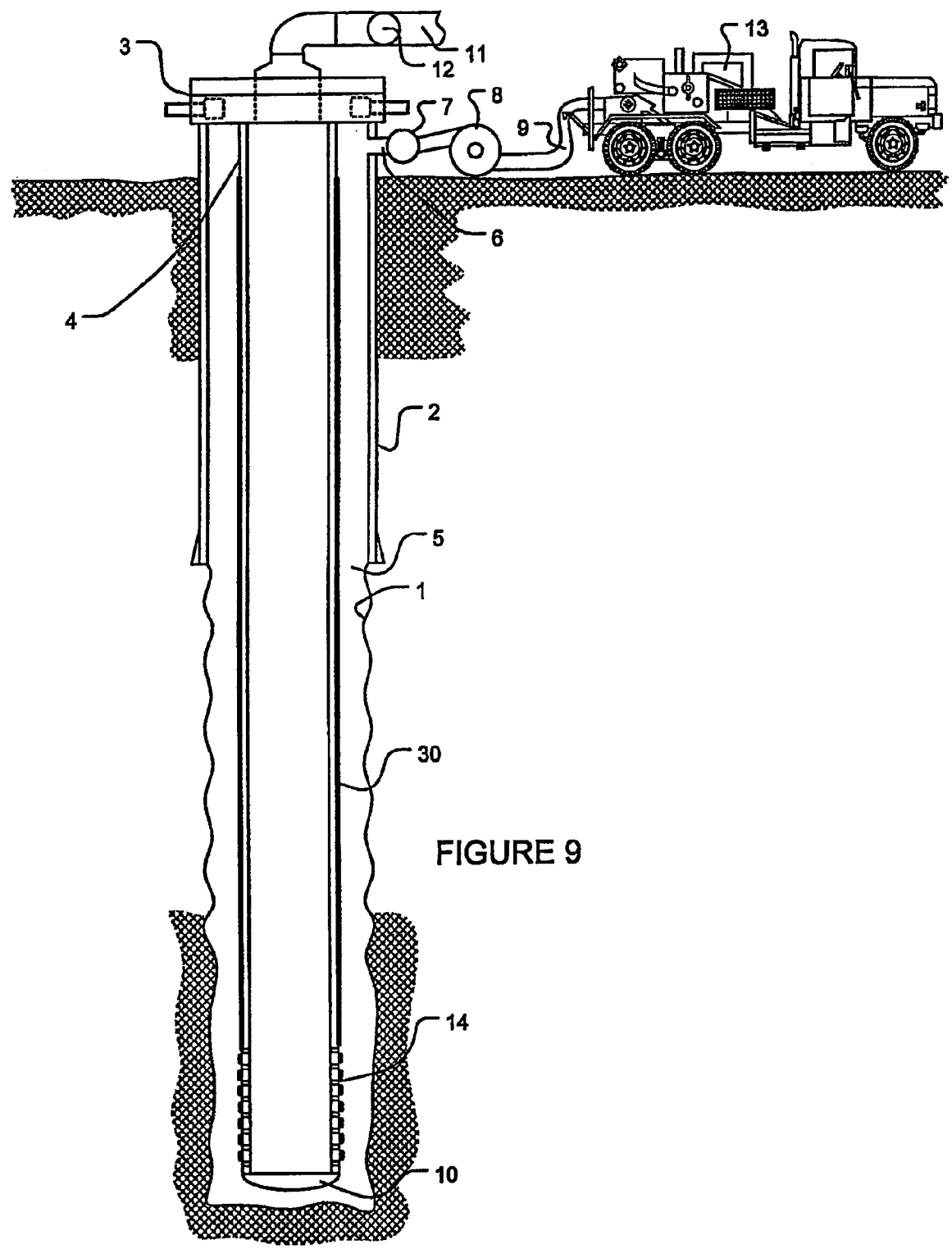
FIG. 9 illustrates a cross sectional side view of a well bore.

Referring now to FIG. 9, an alternate embodiment of the present invention is depicted therein. Surface casing 2, having well head 3 attached thereto, is installed in well bore 1. Casing 4 is suspended from well head 3 to the bottom of the rat hole in well bore 1. Annulus 5 is defined between casing 4 and well bore 1. Annulus flow line 6 fluidly communicates with annulus 5 through well head 3 and/or surfacing casing 2. Annulus valve 7 and annulus pump 8 are connected in annulus flow line 6. Pump truck 13 is connected to annulus pump 8 via truck hose 9. ID flow line 11 is connected to well head 3 to allow fluid communication with the inner diameter of casing 4. ID valve 12 is connected in ID flow line 11. At the lower most end of casing 4, circulation ports 14 are formed in the walls of casing 4 to allow fluid communication between annulus 5 and the inner diameter of casing 4. Casing shoe 10 is connected to the bottom of casing 4. Set retarder 30 is resident on the exterior surface of casing 4 between well head 3 and circulation ports 14. In certain embodiments of the present invention, set retarder 30 may be resident on the exterior surface of casing 4 between circulation ports 14, as shown in FIG. 9. In these embodiments of the present invention, wherein set retarder 30 is disposed on an exterior surface of casing 4, the cement compositions useful with these embodiments generally will comprise, inter alia, suitable cements and suitable base fluids. Optionally, the cement compositions may comprise suitable activators, examples of which have been described previously herein. Optionally, the cement compositions useful with these embodiments may comprise suitable fluid loss control additives, suitable mechanical property modifiers, and other optional components. In certain optional embodiments of the present invention, an optional set retarder may be present in the cement composition. One of ordinary skill in the art, with the benefit of this disclosure, will be able to determine whether a set retarder should be included within the cement compositions useful with these embodiments of the present invention illustrated in FIG. 9, in view of the presence of set retarder 30 on the outer surface of casing 4. Set retarder 30 may be placed on the outer surface of casing 4 in a variety of ways, including, inter alia, those previously described herein as suitable means for applying a compound to the outside of a casing string—e.g., spraying set retarder 30 onto the outer surface of casing 4, and the like. In certain of these embodiments, set retarder 30 optionally may be applied to the interior of casing 4 as well as to the exterior of casing 4.

In certain of the embodiments illustrated in FIG. 9, set retarder 30 may be applied to the exterior of casing 4, and a suitable encapsulant (not shown in FIG. 9) may be applied over set retarder 30. Inter alia, the activator-encapsulants previously described herein may be suitable for use as set-retarder-encapsulants in the embodiments illustrated in FIG. 9. In certain embodiments of the present invention, casing 4 may comprise an expandable tubular that may be expanded (e.g., by means known in the art, such as a back-reamer), which may fracture or degrade the set-retarder-encapsulant, thereby permitting contact between set retarder 30 and the cement composition.

Still with reference to FIG. 9, a cement composition may be pumped into annulus 5 in a reverse-circulation direction by pump truck 13 and annulus pump 8. As the cement composition flows down annulus 5, it contacts set retarder 30 on the exterior of casing 4. Set retarder 30 retards the cement composition to extend the amount of time in which the cement composition will remain in a fluid state in annulus 5. The time during which the cement composition remains in a fluid state in annulus 5 will depend on a variety of factors including, inter alia, temperature in annulus 5, the presence or absence of an activator in the cement composition, and the amount of set retarder 30 present on the outside of casing 4. One of ordinary skill in the art, with the benefit of this disclosure, will be able to recognize the appropriate amount of set retarder 30 to be placed on the exterior of casing 4 in order for a particular cement composition to remain fluid in annulus 5 for a particular desired time. After the expiration of the desired time, the cement composition may set in annulus 5.

Accordingly, an example of a method of the present invention is a method of cementing in a subterranean formation, comprising: placing a cement composition comprising a base fluid, a cement, and a set retarder in a subterranean formation; providing a pipe string comprising an activator disposed on an outer surface of the pipe string; placing the pipe string into the subterranean formation; allowing the cement composition to be activated by the activator; and permitting the cement composition to set in the subterranean formation.

Another example of a method of the present invention is a method of cementing in a subterranean formation comprising a well bore, comprising: providing a pipe string comprising an activator on an outer surface of the pipe string; placing the pipe string into the well bore, whereby an annulus is defined between the outer surface of the pipe string and the walls of the well bore; flowing a cement composition into the annulus in a reverse-circulation direction; and permitting the cement composition and the activator to contact each other so as to cause the cement composition to set within the annulus.

Another example of a method of the present invention is a method of cementing in a subterranean formation comprising a well bore comprising: providing a pipe string comprising a set retarder on an outer surface of the pipe string; placing the pipe string into the well bore, whereby an annulus is defined between the outer surface of the pipe string and the walls of the well bore; flowing a cement composition into the annulus in a reverse-circulation direction; and permitting the cement composition and the set retarder to contact each other so as to extend the amount of time during which the cement composition remains fluid within the annulus.

Another example of a method of the present invention is a method of cementing in a subterranean formation comprising a well bore, comprising: providing a pipe string comprising an activator disposed adjacent an outer surface of the pipe string; placing the pipe string into the well bore, whereby an annulus is defined between the outer surface of the pipe string and the walls of the well bore; flowing a cement composition into the annulus in a reverse-circulation direction; permitting a portion of the cement composition and the activator to contact each other so as to cause the portion of the cement composition to flash set in the annulus.

An example of an apparatus of the present invention is a pipe string comprising: at least one pipe section; and a delivery system of an activator.

Another example of an apparatus of the present invention is a pipe string comprising: at least one pipe section; and a delivery system of a set retarder.

Therefore, the present invention is well adapted to carry out the objects and attain the ends and advantages mentioned as well as those which are inherent therein. While the invention has been depicted and described by reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

The invention claimed is:

1. A method of cementing in a subterranean formation comprising a well bore comprising:
   providing a pipe string comprising an activator exposed on an outer surface of the pipe string;
   placing the pipe string into the well bore, whereby an annulus is defined between the outer surface of the pipe string and the walls of the well bore;
   flowing a cement composition into the annulus in a reverse-circulation direction; and
   permitting the cement composition and the activator to contact each other so as to cause the cement composition to set within the annulus.

2. The method of claim 1 wherein the cement composition has a leading edge, and wherein the pipe string has an inner diameter, and wherein the cement composition sets before the leading edge enters the inner diameter of the pipe string.

3. The method of claim 1 wherein the activator is sodium hydroxide or sodium carbonate.

4. The method of claim 1 wherein the activator is an amine compound.

5. The method of claim 1 wherein the activator is triethanol amine, diethanol amine, tripropanolamine, tri-isopropanolamine, or a mixture thereof.

6. The method of claim 1 wherein the activator is a salt of a material selected from the group consisting of calcium, sodium, magnesium, and aluminum.

7. The method of claim 1 wherein the activator is calcium chloride, sodium chloride, sodium aluminate, magnesium chloride, sodium silicate, or a mixture thereof.

8. The method of claim 1 wherein providing a pipe string comprising an activator on an outer surface of the pipe string further comprises affixing the activator to a first side of a substrate having two sides, and affixing the second side of the substrate to the outer surface of the pipe string.

9. The method of claim 1 wherein:
   the pipe string has an inner diameter and an inner surface; and
   a set retarder is disposed on the inner surface.

10. The method of claim 9, wherein permitting the cement composition to set in the subterranean formation does not comprise permitting the cement composition to set in the inner diameter of the pipe string.

11. The method of claim 1 wherein the cement is a high aluminate cement and the activator is an initiator.

12. The method of claim 11 wherein the initiator is sodium polyphosphate.

13. The method of claim 1 wherein the cement is a phosphate cement and the activator is an initiator.

14. The method of claim 13 wherein the initiator is an alkali metal phosphate salt.

* * * * *